United States Patent
Hodges et al.

(10) Patent No.: US 10,121,331 B1
(45) Date of Patent: Nov. 6, 2018

(54) DETECTION OF UNAUTHORIZED DEVICES ON ATMS

(71) Applicant: CAPITAL ONE SERVICES, LLC, McLean, VA (US)

(72) Inventors: William A. Hodges, Mechanicsville, VA (US); Christopher R. Marshall, Glen Allen, VA (US); Pierrick Burgain, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/019,296

(22) Filed: Jun. 26, 2018

Related U.S. Application Data

(63) Continuation of application No. 15/819,137, filed on Nov. 21, 2017, now Pat. No. 10,026,270, which is a continuation of application No. 14/606,342, filed on Jan. 27, 2015, now Pat. No. 9,922,506.

(60) Provisional application No. 61/982,991, filed on Apr. 23, 2014, provisional application No. 61/932,311, filed on Jan. 28, 2014.

(51) Int. Cl.
*G07F 19/00* (2006.01)
*G06Q 20/10* (2012.01)

(52) U.S. Cl.
CPC ..... *G07F 19/2055* (2013.01); *G06Q 20/1085* (2013.01)

(58) Field of Classification Search
CPC .................................................. G07F 19/2055
USPC ...................................... 705/18, 43; 235/379
See application file for complete search history.

(56) References Cited

U.S. PATENT DOCUMENTS

| | | |
|---|---|---|
| 8,418,917 B1 | 4/2013 | Lewis et al. |
| 8,833,669 B1 | 9/2014 | Chin et al. |
| 2005/0201450 A1 | 9/2005 | Volpi et al. |
| 2006/0169764 A1 | 8/2006 | Ross et al. |
| 2007/0057070 A1 | 3/2007 | Scarafile et al. |
| 2007/0063838 A1 | 3/2007 | Yuzik |
| 2008/0191860 A1 | 8/2008 | Flook et al. |
| 2011/0164811 A1 | 7/2011 | Ishiyama |
| 2013/0106576 A1 | 5/2013 | Hinman et al. |
| 2013/0106577 A1 | 5/2013 | Hinman et al. |
| 2013/0182904 A1 | 7/2013 | Zhong et al. |
| 2013/0342317 A1 | 12/2013 | Rimai et al. |
| 2013/0342323 A1 | 12/2013 | Hinman et al. |
| 2014/0372305 A1 | 12/2014 | Ray et al. |
| 2015/0091547 A1 | 4/2015 | Vasilev et al. |
| 2015/0213427 A1 | 7/2015 | Hodges et al. |

OTHER PUBLICATIONS

Office Action dated Oct. 8, 2015 in U.S. Appl. No. 14/608,423 to William A. Hodges entitled "ATM Skimmer Detection Based Upon Incidental RF Emissions" filed on Jan. 27, 2015.
Office Action dated Mar. 28, 2016 in U.S. Appl. No. 14/606,423 to William A. Hodges entitled "ATM Skimmer Detection Based Upon Incidental RF Emissions" filed on Jan. 27, 2015.

(Continued)

*Primary Examiner* — A Hunter Wilder
(74) *Attorney, Agent, or Firm* — Finnegan, Henderson, Farabow, Garrett & Dunner LLP

(57) ABSTRACT

The disclosed embodiments include methods and systems for detecting ATM skimmers, other unauthorized devices, such as hidden video cameras or keypad overlays, and/or possible damage to the ATM based upon radio frequency (RF) signal emitted from the ATM and/or 3D image analysis.

19 Claims, 12 Drawing Sheets

(56) References Cited

OTHER PUBLICATIONS

Pre-Brief Appeal Conference Decision dated Sep. 23, 2016 in U.S. Appl. No. 14/606,423 to William A. Hodges entitled "ATM Skimmer Detection Based Upon Incidental RF Emissions" filed on Jan. 27, 2015.
Office Action dated Feb. 10, 2017 in U.S. Appl. No. 14/606,423 to William A. Hodges entitled "ATM Skimmer Detection Based Upon Incidental RF Emissions" filed on Jan. 27, 2015.
Notice of Allowability dated Sep. 21, 2017 in U.S. Appl. No. 14/606,423 to William A. Hodges entitled "ATM Skimmer Detection Based Upon Incidental RF Emissions" filed on Jan. 27. 2015.
Notice of Allowability dated Oct. 5, 2017 in U.S. Appl. No. 14/606,423 to William A. Hodges entitled "ATM Skimmer Detection Based Upon Incidental RF Emissions" filed on Jan. 27, 2015.
International Search Report and Written Opinion of the International Searching Authority in International Application No. PCT/US 15/13053, dated Apr. 16, 2015 (13 pages).
"Detecting Skimmers and other ATM traps," [online], May 2013 [retrieved Mar. 29, 2015]. Retrieved from the Internet http://security.stackexhange.com/questions/36135/detecting-skimmers-and-other-atm-traps.
Office Action dated Jul. 10, 2017 in U.S. Appl. No. 14/606,342 to William A. Hodges entitled "Detection of Unauthorized Devices on ATMs" filed on Jan. 27, 2015.
Notice of Allowability dated Nov. 7, 2018 in U.S. Appl. No. 14/606,342 to William A. Hodges entitled "Detection of Unauthorized Devices on ATMs" filed on Jan. 27, 2015.
Notice of Allowability dated Mar. 15, 2018 in U.S. Appl. No. 15/819,137 to William A. Hodges entitled "ATM Skimmer Detection Based Upon Incidental RF Emissions" filed on Nov. 21, 2017.

DETECTION OF UNAUTHORIZED DEVICES ON ATMS

CROSS-REFERENCE TO RELATED APPLICATIONS

This application is a continuation of U.S. patent application Ser. No. 15/819,137, filed on Nov. 21, 2017 (now allowed), which is a continuation of U.S. patent application Ser. No. 14/606,342, filed on Jan. 27, 2015, now U.S. Pat. No. 9,922,506, which claims priority to U.S. Provisional Application No. 61/932,311, filed on Jan. 28, 2014, and U.S. Provisional Application No. 61/982,991, filed on Apr. 23, 2014. The aforementioned applications are incorporated herein by reference in their entireties.

TECHNICAL FIELD

The present disclosure relates generally to methods and systems for detecting unwanted electronic devices and, more particularly, to methods and systems for detecting automated teller machine ("ATM") skimmers, unauthorized video cameras, keypad overlays, and/or other unauthorized devices.

BACKGROUND

An ATM is an electronic device that allows banking customers to carry out financial transactions without the need for a human teller. For example, customers may use an ATM to access their bank accounts, deposit, withdraw, or transfer funds, check account balances, or dispense items of value. Generally, to use an ATM, the customer may insert a banking card containing magnetic stripe information into the ATM's card reader, and authenticate the card by entering a personal identification number (PIN). After the card has been read and authenticated, the customer can carry out various financial transactions.

While ATMs are convenient, their use can also be risky. Thieves have been known to attach devices known as "skimmers" on or adjacent to ATMs to capture the card information and PINs entered by the customer. These skimmers can remain on the ATM for an extended period of time prior to detection, and are sometimes constructed to match the visual appearance of the ATM's card reader. Thus, the customer is unable to determine whether the device is a skimmer or part of the ATM itself. Skimmers may also be used in conjunction with video cameras designed to record the customers' PINs or other entered account data. The video cameras are often hidden and/or designed to blend in with the appearance ATM so that a customer is unable to detect anything out of the ordinary. Skimmers may also be used in conjunction with a keypad overlay placed on top of the ATM's keypad. The keypad overlay contains circuitry that records the numbers that customers type as they enter their PINs. The keypad overlays, however, are typically designed to blend in with the appearance of the ATM, making them difficult for customers to detect.

To combat these unauthorized devices, bank employees often conduct periodic visual reviews of the ATM's appearance. However, these visual reviews are error prone (sometimes the skimmer, video camera, and/or keypad overlay is not found), labor intensive, time consuming, and expensive. Accordingly, a need exists to detect these unauthorized devices quickly and inexpensively and thus mitigate the risk of the compromise of a customer's card data.

BRIEF SUMMARY

The disclosed embodiments include methods, systems, and non-transitory computer-readable storage media for detecting ATM skimmers based upon radio frequency (RF) signals emitted from the ATM. In one aspect, the disclosed embodiments include a system for detecting ATM skimmers including a memory storing instructions and one or more processors that execute the instructions to perform one or more operations for detecting ATM skimmers. The operations may include, for example, receiving radio frequency (RF) signal data corresponding to one or more detected RF signals emitted by an ATM and/or other electronic device and detected by an antenna located within communication range of the ATM. The operations may also include determining one or more unidentified RF signals of the detected ATM RF signals that differ from one or more baseline RF signals. The operations may also include determining whether the one or more unidentified RF signals are present for a predetermined period of time, and determining whether a skimmer is present at the ATM based on a determination that the one or more unidentified RF are present for the predetermined period of time.

The disclosed embodiments may also include a computer-implemented method for detecting ATM skimmers. In one aspect, the method may include receiving radio frequency (RF) signal data corresponding to one or more detected RF signals emitted by an ATM and detected by an antenna located within communication range of the ATM. The method may also include determining one or more unidentified RF signals of the detected ATM RF signals that differ from one or more baseline RF signals. The method may also include determining whether the one or more unidentified RF signals are present for a predetermined period of time and determining whether a skimmer is present at the ATM based on a determination that the one or more unidentified RF signals are present for the predetermined period of time.

The disclosed embodiments may also include a non-transitory computer-readable storage medium. In one aspect, the non-transitory computer-readable storage medium may be encoded with instructions which, when executed on a processor, perform a method. The method may include receiving radio frequency (RF) signal data corresponding to one or more detected RF signals emitted by an ATM and detected by an antenna located within communication range of the ATM. The method may also include determining one or more unidentified RF signals of the detected ATM RF signals that differ from one or more baseline RF signals. The method may also include determining whether the one or more unidentified RF signals are present for a predetermined period of time, and determining whether a skimmer is present at the ATM based on a determination that the one or more unidentified RF signals are present for the predetermined period of time.

The disclosed embodiments include methods, systems, and non-transitory computer-readable storage media for detecting unauthorized devices located on and/or possible damage to an ATM based upon 3D image analysis of the ATM. In certain embodiments, a system for detecting unauthorized devices on an ATM may comprise a memory storing instructions and one or more processors that execute the instructions to perform one or more operations for detecting unauthorized devices on the ATM. The operations may comprise capturing 3D image data for the ATM, wherein the 3D image data comprises shape data for the ATM, determining one or more differences between the detected shape data and baseline shape data for the ATM, comparing the location of the determined one or more differences to known locations for unauthorized devices, and determining whether an unauthorized device is present at the ATM based on a determination that the one or more differences are located at a known location for unauthorized devices. In certain embodiments the 3D image data is captured when motion is not detected near the ATM. In certain embodiments the operations may further include determining whether the unauthorized device is a known authorized device based on a comparison of the detected shape data to the shape data of a known unauthorized device and may include storing the shape data for the unauthorized device in a memory when it is determined that the shape data does not match the shape data of a known device. The operations may also include generating an alert when it is determined that an unauthorized device is present at the ATM, wherein the alert may comprise a location of the ATM.

The disclosed embodiments include methods, systems, and non-transitory computer-readable storage media for detecting unauthorized devices, including skimmers, located on and/or possible damage to an ATM based upon RF signals and 3D image analysis of the ATM. In certain embodiments, a system for detecting such unauthorized devices and/or possible damage may comprise a memory storing instructions and one or more processors that execute the instructions to perform one or more operations for detecting unauthorized devices and/or possible damage. The operations may include receiving RF signal data corresponding to one or more detected RF signals emitted by an ATM and detected by an antenna located within communication range of the ATM, determining one or more unidentified RF signals of the detected ATM RF signals that differ from one or more baseline RF signals, determining whether the one or more unidentified RF signals are present for a predetermined period of time, and determining whether a potential skimmer is present at the ATM based on a determination that the one or more unidentified RF signals are present for the predetermined period of time. The operations may also include capturing 3D image data for the ATM, wherein the 3D image data comprises shape data for the ATM, determining one or more differences between the detected shape data and baseline shape data for the ATM, comparing the location of the determined one or more differences to known locations for unauthorized devices, determining whether a potential unauthorized device is present at the ATM based on a determination that the one or more differences is located at a known location for unauthorized devices, and generating an alert if when is determined that a potential skimmer and a potential unauthorized device is present at the ATM.

It is to be understood that both the foregoing general description and the following detailed description are exemplary and explanatory only and are not restrictive of the disclosed embodiments, as claimed. Further features and/or variations may be provided in addition to those set forth herein. For example, disclosed embodiments may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute part of this specification, illustrate various embodiments and together with the description, serve to explain one or more aspects of the disclosed embodiments. In the drawings.

DETAILED DESCRIPTION

Figure 1:
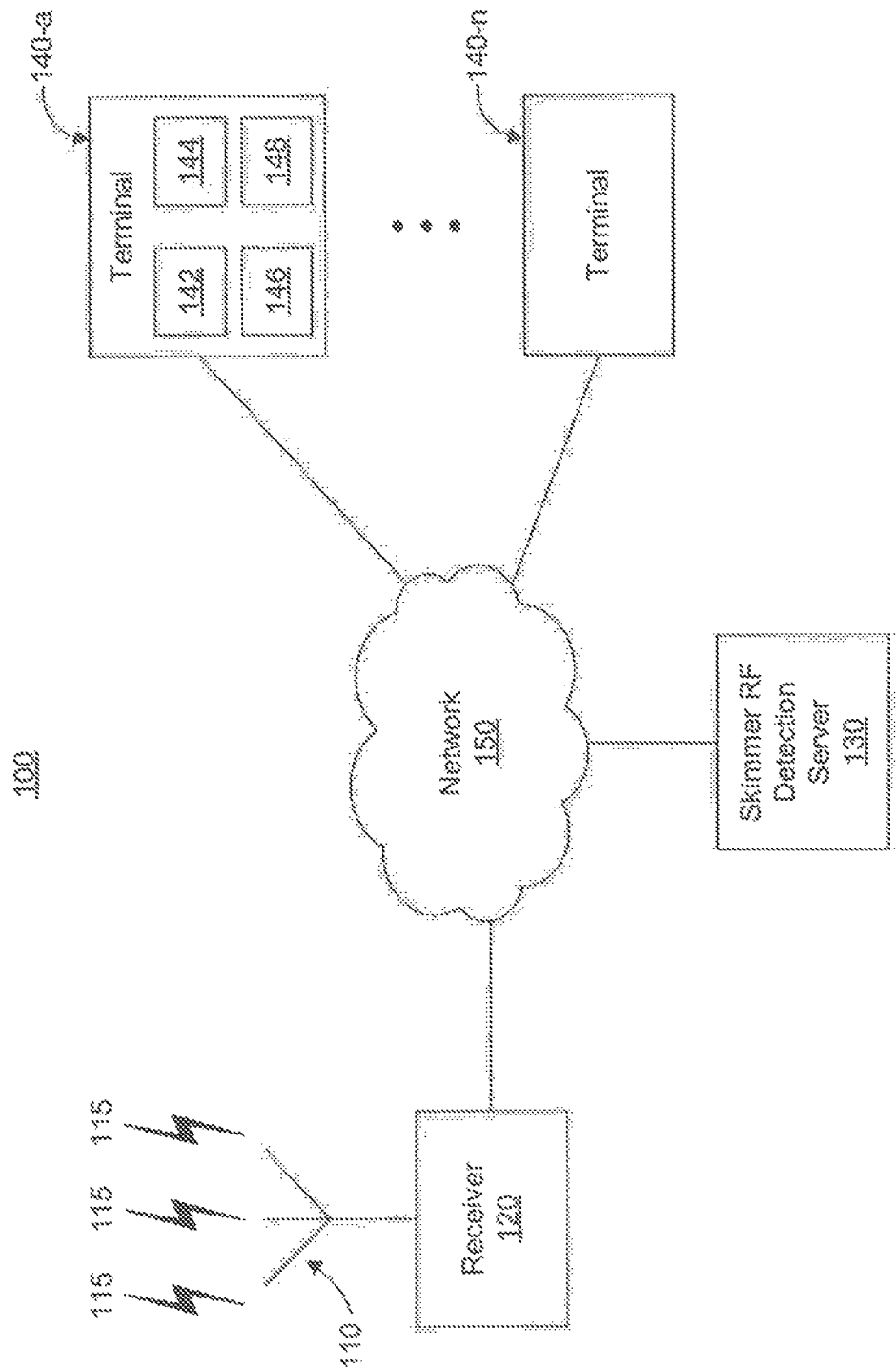
FIG. 1 is a block diagram of exemplary skimmer RF detection system 100 consistent with disclosed embodiments.

The following detailed description refers to the accompanying drawings. Wherever possible, the same reference numbers are used in the drawings and the following description to refer to the same or similar parts. While several exemplary embodiments and features of the disclosed embodiments are described herein, modifications, adaptations, and other implementations are possible, without departing from the spirit and scope of the disclosed embodiments. Accordingly, the following detailed description does not limit the disclosed embodiments. Instead, the proper scope of the disclosed embodiments may be defined by the appended claims.

Almost all electronic devices emit radio frequency ("RF") signals incidental to their operation. Thus, the disclosed embodiments may use these incidental RF emissions to detect skimmer devices present on ATMs. To this end, an exemplary system may be configured to determine one or more baseline RF signals associated with an ATM, detect RF signals near the ATM, and/or determine any differences between the baseline RF signals and the detected RF signals. The system may also determine whether a skimmer is present based on the detected RF signals. For example, the system may compare the detected RF signals to data contained in a known skimmer emissions database to determine whether the detected RF signals match any known ATM skimmers. As another example, the system may also determine that a skimmer is present based on the number and type of detected RF emissions in various frequency ranges and/or the period of time that the particular RF emissions are detected. As yet another example, the system may also detect increases in ambient RF noise levels that are not clearly confined to specific frequencies. The system may also include multiple receiving antennas to enable a directional read of the source of the RF emissions to reduce false positives.

FIG. 1 is a block diagram of exemplary skimmer RF detection system 100 consistent with disclosed embodiments. System 100 may be implemented in a number of different configurations without departing from the scope of the disclosed embodiments. In the embodiment shown in FIG. 1, system 100 may include an antenna 110 adapted to detect one or more RF signals 115 and a receiver 120 that receives the RF signals detected by antenna 110 and converts those signals to digital data. System 100 may also include a skimmer RF detection server 130 that may be configured to demodulate the digital data and analyze the demodulated data to detect whether a skimmer is present on or near an ATM. System 100 may also include one or more client terminals 140-*a* to 140-*n*, and a network 150 for interconnecting one or more of antenna 110, receiver 120, skimmer RF detection server 130, and client terminals 140-*a* to 140-*n*. While FIG. 1 shows only one antenna 110, receiver 120, and skimmer RF detection server 130, system 100 may induce any number of antennas 110, receivers 120, and skimmer RF detection servers 130.

Antenna 110 may be any type of known antenna capable of detecting RF signals. For example, antenna 110 may be any type of commercially available wideband antenna or tunable antenna.

Receiver 120 may be any type of receiver that can receive one or more frequencies of RF signals, and may be configured in hardware, software and/or some combination of hardware and software. Receiver 120 may also convert the received RF signals into digital data, and send the digital data to one or more devices, such as skimmer RF detection server 130. Receiver 120 may also be associated with a particular ATM and may store identification information related to the ATM (e.g., ATM location, ATM type, etc.) in a memory. Receiver 120 may also transmit the identification information to skimmer RF detection server 130 using any known transmission method such as, for example, using one or more data packets. In some configurations, receiver 120 may be a software defined radio ("SDR") capable of simultaneously listening for a plurality of differently modulated signals at once. Exemplary commercially available SDRs may include RTL-SDR, Zeus ZS-1, and Flex Radio.

Skimmer RF detection server 130 may be a computing system that performs various functions consistent with the disclosed embodiments. In some embodiments, skimmer RF detection server 130 may be configured to process information received from receiver 120. For example, skimmer RF detection server 130 may demodulate the digital data received from receiver 120 and perform analyses on the digital data to determine whether a skimmer is present. As another example, skimmer RF detection server 130 may capture one or more data packets transmitted by receiver 120 and decode the packets' raw data, such as the identification information related to the ATM. Server 130 may also store the decoded raw data in memory 233. Skimmer RF detection server 130 may also generate and send one or more alerts to one or more of user terminals 140-*a* through 140-*n*. Certain functions that may be performed by skimmer RF detection server 130 are described in greater detail below with respect to, for example, FIGS. 2-4.

Each user terminal 140 may be a computing system operated by a user. In one example, user terminal 140 may be a computing device configured to perform one or more operations consistent with certain disclosed embodiments. For example, terminal 140 may be configured to generate and/or display alerts indicating that a skimmer has been detected on one or more ATMs. Terminal 140 may be a desktop computer, a laptop, a server, a mobile device (e.g., tablet, smart phone, etc.), and any other type of computing device. User terminal 140 may include one or more processors configured to execute software instructions stored in memory. The disclosed embodiments are not limited to any particular configuration of user terminal 140. For instance, as shown in FIG. 1 (for simplicity, in terminal 140-*a* only), user terminal 140 may include, for example, a processor 142, a memory 144, a display device 146, and an interface device 148. Processor 142 may be one or more processor devices, such as a microprocessor, or other similar processor device(s) that executes program instructions to perform various functions. Memory 144 may be one or more storage devices that maintain data (e.g., instructions, software applications, etc.) used and/or executed by processor 142. Display device 146 may be any known type of display device that presents information to a user operating terminal 140. Interface device 148 may be one or more known interface device modules that facilitate the exchange of data between the internal components of user terminal 140 and external components, such as skimmer RF detection server 130. In one embodiment, interface device 148 may include a network interface device that allows user terminal 140 to receive and send data to and from network 150.

Network 150 may be any type of network that facilitates communication between remote components, such as skimmer RF detection server 130 and terminals 140-*a* to 140-*n*. For example, network 150 may be a local area network (LAN), a wide area network (WAN), a virtual private network, a dedicated intranet, the Internet, and/or a wireless network.

The arrangement illustrated in FIG. 1 is exemplary and system 100 may be implemented in a number of different configurations without departing from the scope of the disclosed embodiments. For example, components 120 and 130 may be connected through other communication link(s), as opposed to being connected via network 150. Further additional components may be included in system 100, such as a connection to other skimmer detection systems that may provide information to skimmer RF detection server 130. Moreover, one or more of components 110, 120, 130, 140, and/or 150 may be included in a single device or various combinations of devices.

Figure 2:
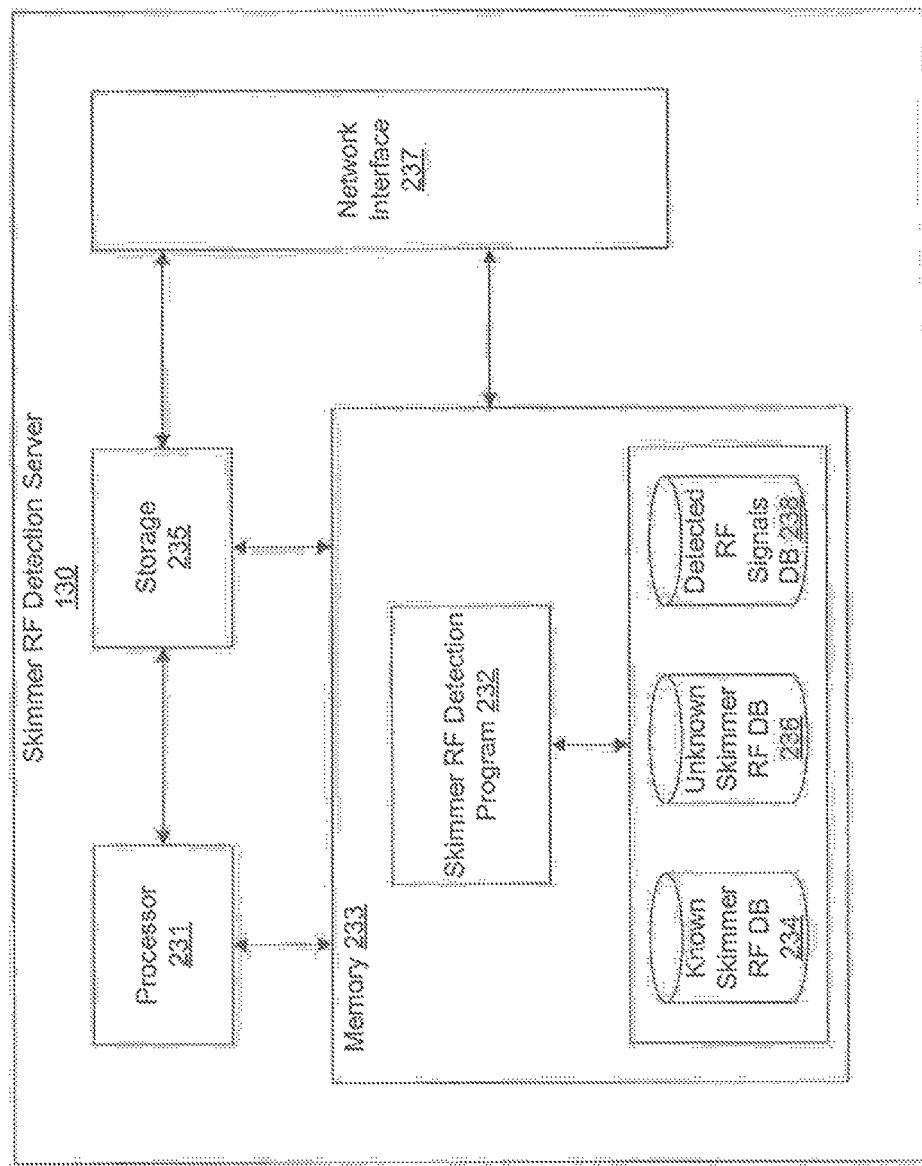
FIG. 2 is a block diagram of exemplary skimmer RF detection server 130 consistent with disclosed embodiments.

FIG. 2 is a block diagram of exemplary skimmer RF detection server 130 consistent with disclosed embodiments. Skimmer RF detection server 130 may be implemented in various ways. For example, skimmer RF detection server 130 may be a special purpose computer, a server, a mainframe computer, a computing device executing software instructions that receive and process information and provide responses, or any combination of those components. In one example, as shown in FIG. 2, skimmer RF detection server 130 may include a processor 231 a memory 233, storage 235, a network interface 237, and input/output (I/O) devices (not shown).

Processor 231 may include one or more processors, such as known processing devices, microprocessors, etc. configured to execute instructions to perform operations. Memory 233 may include one or more storage devices configured to store information used and/or executed by processor 231 to perform one or more operations related to disclosed embodiments. Storage 235 may include volatile or non-volatile, magnetic, semiconductor, tape, optical, removable, nonremovable, or any other type of storage device or tangible computer-readable medium.

In some embodiments, memory 233 may include software instructions that when executed by processor 231, perform operations consistent with disclosed embodiments. For example, memory 233 may include software instructions that when executed perform one or more skimmer detection processes consistent with disclosed embodiments. In one example, memory 233 may include skimmer RF detection program 232. In one embodiment, skimmer RF detection program 232 may be loaded from storage 235 or another source component that, when executed by skimmer RF detection server 130, perform various procedures, operations, and/or processes consistent with disclosed embodiments. For example, memory 233 may include a skimmer RF detection program 232 that performs operations that may determine one or more differences between one or more baseline RF signals and one or more detected RF signals and, based on the detected differences, determine whether a skimmer is present on or near an ATM. Memory 233 may also include other programs that perform other functions and processes, such as programs that provide communication support, Internet access, database access, and the like. Memory 233 may also include one or more interconnected information storage databases, such as, for example, known skimmer RF database 234, unknown skimmer RF database 236, and detected RF signals database 238. The information storage databases can by populated by any known methods. For example, skimmer RF detection server 130 may populate known skimmer RF database 234 by receiving one or more database entries from another component, a wireless network operator, or a user of skimmer RF detection server 130 and/or terminal 140, and storing the database entries into memory 233. The database entries can contain a plurality of fields, one or more of which may include information related to known skimmer devices, such as, for example, skimmer device names, the frequency or frequencies of RF signals emitted by the skimmer device, the amplitude(s) of the RF signals emitted by the skimmer device, one or more images of the skimmer device, information related to disabling the particular skimmer device, and the like. While in the embodiment shown in FIG. 2 the information storage databases are interconnected, each information storage database need not be interconnected. Moreover, rather than separate databases, skimmer RF detection server 130 may include only one database that includes the data of databases 234, 236, and 238. Memory 233, in conjunction with processor 231, may also be capable of accessing, creating and/or otherwise managing data remotely through network 150.

Methods, systems, and articles of manufacture consistent with disclosed embodiments are not limited to separate programs or computers configured to perform dedicated tasks. For example, memory 233 may be configured with a skimmer RF detection program 232 that performs several processes when executed by processor 231. For example, memory 233 may include a single skimmer RF detection program 232 that performs the functions of the skimmer detection system, or skimmer RF detection program 232 could comprise multiple programs. Moreover, processor 231 may execute one or more programs located remotely from skimmer RF detection server 130. For example, skimmer RF detection server 130 may access one or more remote programs that, when executed, perform functions related to disclosed embodiments.

Memory 233 may also be configured with an operating system (not shown) that performs several functions well known in the art when executed by skimmer RF detection server 130. By way of example, the operating system may be Microsoft Windows, Unix, Linux, Apple Computer operating systems, or some other operating system. The choice of operating system, and even the use of an operating system, is not critical to any embodiment.

Skimmer RF detection server 130 may include one or more I/O devices (not shown) that allow data to be received and/or transmitted by skimmer RF detection server 130. I/O devices may also include one or more digital and/or analog communication input/output devices that allow skimmer RF detection server 130 to communicate with other machines and devices, such as terminals 140-a to 140-n. The configuration and number of input and/or output devices incorporated in I/O devices may vary as appropriate for certain embodiments.

Figure 3:
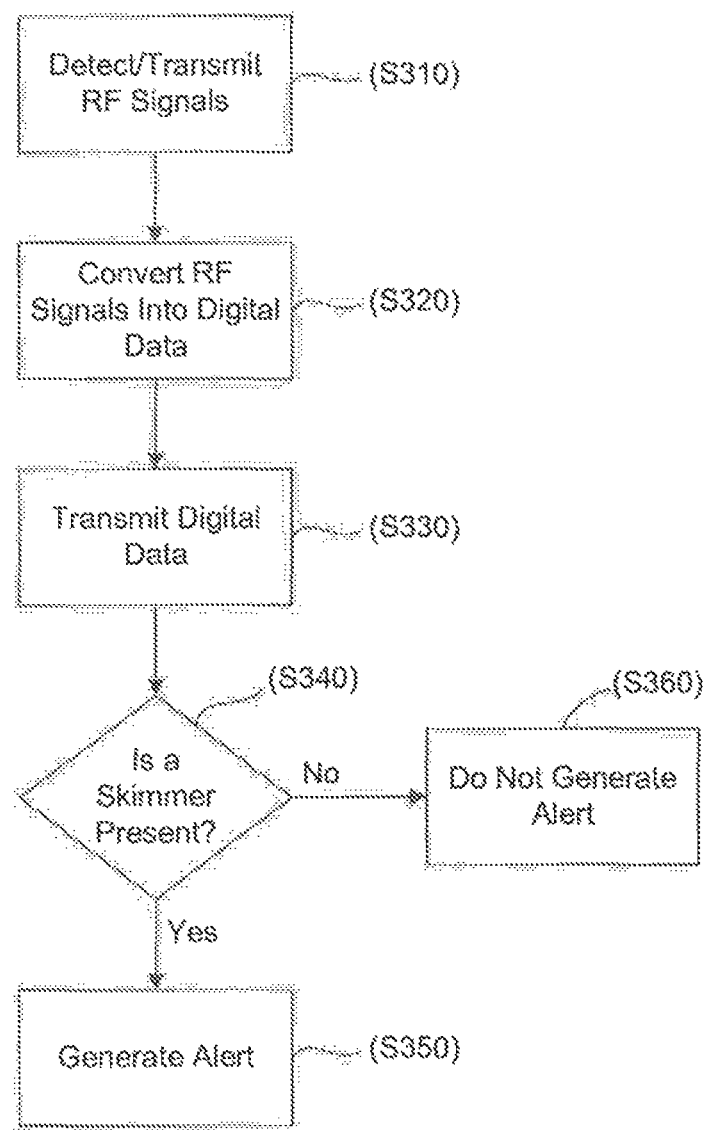
FIG. 3 is a flow chart demonstrating exemplary process 300 for detecting ATM skimmers based on RF detection consistent with disclosed embodiments.

FIG. 3 is a flow chart demonstrating exemplary process 300 for detecting ATM skimmers based on RF detection consistent with disclosed embodiments. In certain aspects, one or more operations of the skimmer detection process 300 may be performed by skimmer RF detection server 130. One or more operations of process 300 may be performed by other components of system 100, such as receiver 120, etc. In one embodiment, skimmer RF detection server 130 may execute software instructions to perform operations of process 300 to detect one or more skimmer devices that may be present on one or more ATMs. In one example, antenna 110 may detect one or more RF signals 115 emitted by one or more electronic devices and transmit those RF signals to receiver 120 (S310). The detected RF signals may be signals incidentally generated by the ATM, by non-threatening electronic devices near the ATM (such as customers' cell-phones), and/or by skimmers. Receiver 120 may receive the detected RF signals and convert those analog RF signals into digital data capable of being processed by skimmer RF detection server (S320) using any known method for converting analog data within an SDR into a format usable by a demodulation component. For example, the data may be converted and output as I/Q data using SDR hardware. Receiver 120 may then transmit the digital data to skimmer RF detection server 130 (S330). Receiver 120 may also transmit additional data to skimmer RF detection server 130. For example, receiver 120 may access ATM identification information from one or more internal or external memories and transmit the identification information to skimmer RF detection server 130 via any known transmission method such as, for example, via one or more data packets. The additional data may be sent separately from, or in combination with, the digital data. For example, data packets containing the digital data and data packets containing the identification information may be combined by a packet combiner and transmitted to skimmer RF detection server 130.

Skimmer RF detection server 130 may receive and store the digital data in one or more memories, such as in detected RF signals database 238 of memory 233. Skimmer RF detection server 130 may execute software instructions that perform operations to determine whether or not a skimmer is present on the ATM (S340). In one aspect, skimmer RF detection server 130 may demodulate the digital data and analyze it in accordance with software instructions to determine whether a skimmer is present. In one embodiment, for example, skimmer RF detection server 130 may differentiate between RF signals generated by the ATM and/or other non-harmful devices and those generated by a skimmer. This analysis is described in further detail with respect to FIG. 4. If skimmer RF detection server 130 determines that a skimmer is present, skimmer RF detection server 130 may generate an alert (S350). In one embodiment, skimmer RF detection server 130 may be configured to generate and provide an alert to one or more terminals 140-a to 140-n. In certain aspects, skimmer RF detection server 130 may be configured to generate an alert to include information associated with characteristics of the skimmer, the identity of the ATM where the skimmer was detected, etc. In certain aspects, receiver 120 may provide identification information associated with the ATM that provided signals 115 detected by antenna 110.

In one embodiment, skimmer RF detection server 130 may be configured to determine the type of detected skimmer. For example, skimmer RF detection server 130 may perform operations that determine whether the detected skimmer has one or more characteristics that match those of a known type of skimmer through analysis of information stored in known skimmer RF database 234. In such instances, skimmer RF detection server 130 may generate an alert such that it includes skimmer related information obtained, for example, from known skimmer RF database 234. For example, if skimmer RF detection server 130 has identified the detected skimmer, skimmer RF detection server 130 may query known skimmer RF database 234 to match the detected skimmer to database entries of known skimmers in the known skimmer RF database 234. If skimmer RF defection server 130 determines a match between the detected skimmer and a database entry, skimmer RF detection server 130 may populate an alert template with information contained in the matching database entry and/or with information linked to the matching database entry. For example, in some embodiments, skimmer RF detection server 130 may generate the alert such that it may include one or more images (e.g., digital picture, or the like) of the detected skimmer, information about how to remove, disable, etc. the skimmer, and the like. In certain embodiments, if skimmer RF detection server 130 has determined the detected skimmer is an unknown skimmer, skimmer RF detection server 130 may generate information in the alert that provides directions on how a user may populate unknown skimmer RF database 236 with information related to the unknown skimmer (e.g., how to input information related to detected RF signals emitted by the particular skimmer device, how to create and/or upload one or more images of the particular skimmer device, how the user disabled the particular skimmer device, and the like. In certain aspects, if skimmer RF detection server 130 determines that a skimmer is not present (step S340; No), skimmer RF detection server 130 may not generate an alert (S360).

The disclosed embodiments may implement process 300 such that the disclosed embodiments may monitor a plurality of ATMs to determine whether one or more skimming devices are present on the ATMs. In certain aspects, the disclosed embodiments may be configured to generate and store data related to multiple skimming devices detected at respective ATMs, at a central location, such as skimmer RF detection server 130. For example, system 100 may be configured to use data gathered from a plurality of ATMs to identify skimmers (e.g., new, known, etc.) and store that data for use by skimmer RF detection server 130 or by another computing component that may be in communication with skimmer RF detection server 130.

Figure 4:
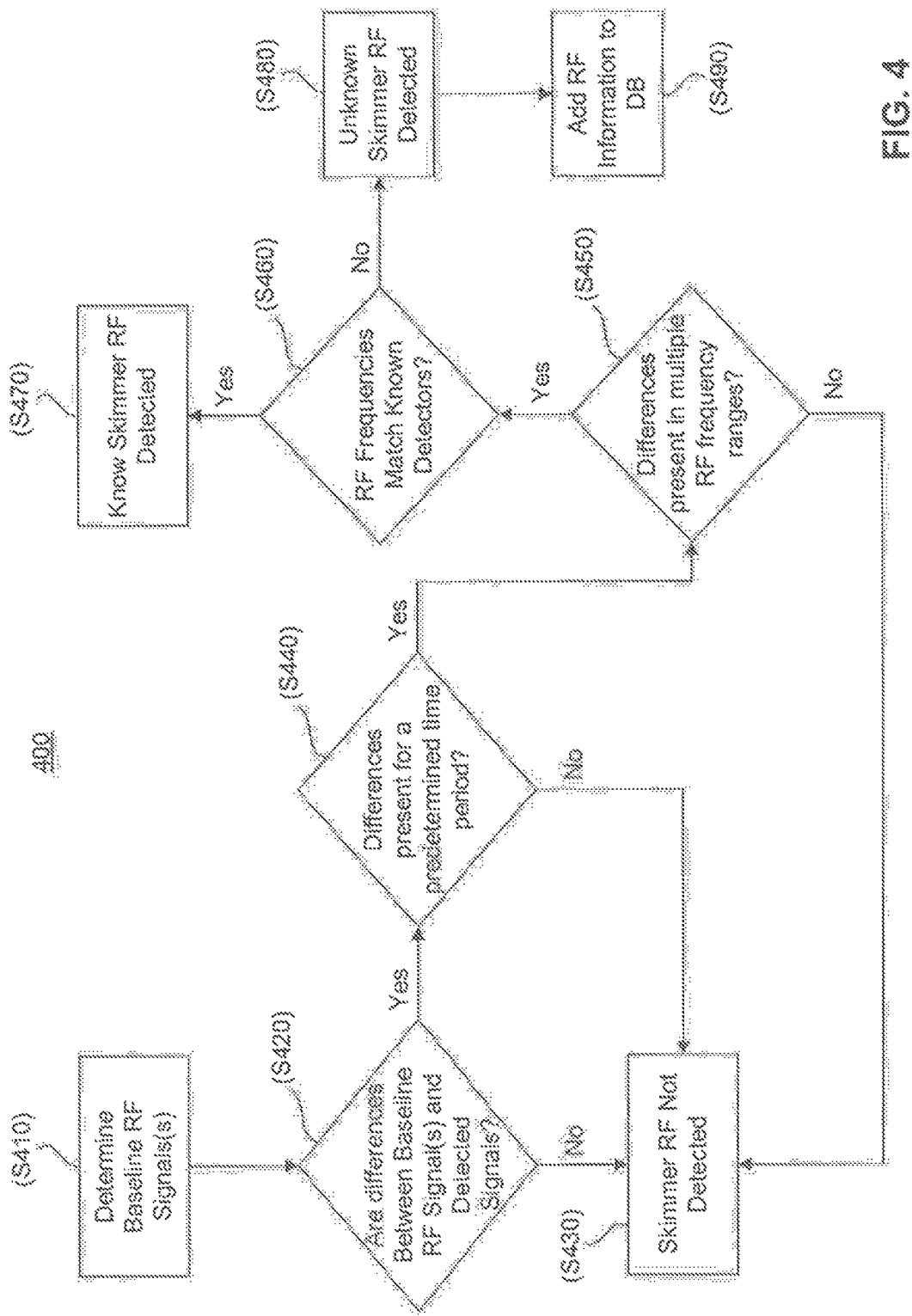
FIG. 4 is a flow chart demonstrating exemplary RF signal analysis process 400 consistent with disclosed embodiments.

FIG. 4 is a flow chart demonstrating exemplary RF signal analysis process 400 consistent with disclosed embodiments. In one embodiment, skimmer RF detection server 130 may be configured to execute one or more operations of process 400 to analyze differences between baseline RF signals and detected RF signals. In certain aspects, process 400 may relate to the processes associated with operation S340 of FIG. 3. In certain embodiments, skimmer RF detection server 130 may execute one or more algorithms to determine one or more baseline signals over a range of frequencies associated with the ATM (S410). For example, skimmer RF detection server 130 may execute algorithms that may establish baselines with confidence intervals for normal non-malicious background activity. New signals may be compared against that baseline and any incremental signal that is statistically different from random Gaussian (RF static) noise may be flagged for additional analysis. Over time, false alarms may be cataloged for future identification and to minimize alerts for non-malicious future RF emission sources. Skimmer RF detection server 130 may also provide instructions to receiver 120 to collect RF signals 115 from an area in proximity to an ATM through antenna 110 during a predetermined period of time when there is no interference from electronic devices, such as when the ATM is first installed. In some embodiments, skimmer RF detection server 130 may receive the predetermined time period from another component, it may be provided via a user using an input device, and/or it may be pre-stored in memory 233, which is accessible by processor 231. In response, receiver 120 may collect these non-interference signals (e.g., baseline signals) and provide them to skimmer RF detection server 130. Skimmer RF detection server 130 may store that information in one or more local or remote databases, such as, for example, databases located in memory 233. As another example, skimmer RF detection server 130 may be programmed with information related to the baseline signals (e.g., the RF signals emitted by a particular type of ATM) for a plurality of ATMs such that information related to the baseline signals are stored in memory (e.g., in a database in memory 233) before skimmer RF detection server 130 provides instructions to receiver 120 to collect RF signals from antenna 110. In some embodiments, skimmer RF detection server 130 may receive the information related to the baseline signals from another component, or it may be set, for example, by a device or component manufacturer, by a wireless network operator, or by a user of skimmer RF detection server 130 and/or terminal 140 using an input device. In certain embodiments, server 130 may determine the particular type of ATM being monitored based on the identification information transmitted by receiver 120 to skimmer RF detection server 130. Skimmer RF detection server 130 may also compare the type of ATM being monitored to one or more entries within the database to identify one or more database entries that match the type of ATM being monitored and may use the matching database entries to determine the baseline signals being used by the particular ATM.

Skimmer RF detection server 130 may determine whether there are any differences between the baseline signals and one or more signal(s) detected by antenna 110 and provided by receiver 120, such as the signals collected during operations S310-S330. For example, skimmer RF defection server 130 may employ a spectrum analyzer that generates signal amplitudes over various frequencies based on the detected signals. In another embodiment, skimmer RF detection server 130 may execute software instructions that perform spectrum analyzer operations to generate signal amplitudes over various frequencies based on the detected signals. Skimmer RF detection server 130 may be configured to determine whether a skimmer device is present when one or more signals exceed a threshold amplitude level. In certain aspects, skimmer RF detection server 130 may be programmed with one or more amplitude threshold levels that may be associated with anomalous operations of an ATM. The threshold level of skimmer RF detection server 130 may be set, for example, by a device or component manufacturer, by a wireless network operator, by a user of skimmer RF detection server 130, and/or by a user of terminal 140. For instance, the threshold level may be set at an amplitude level determined to be appropriate to initiate investigation as to whether the ATM may include a skimmer device such as, for example, an amplitude level 5% greater than the amplitude level of the baseline signal(s).

Skimmer RF detection server 130 may be configured to determine, when analyzing the detected RF signals provided by receiver 120, whether the amplitude of the detected RF signals exceeds the threshold level. If so, skimmer RF detection server 130 may be configured to set a threshold timer to begin measuring the duration of the detected RF signal(s) which exceed the threshold level. When the detected RF signal(s) no longer exceed the threshold level, skimmer RF detection server 130 may instruct the threshold timer to stop measuring the duration of the detected RF signals(s) and to store information relation to the measurement of the duration (e.g., length of duration, time period(s) of duration, etc.) in memory 233. Skimmer RF detection server 130 may also perform a comparison process that determines whether a difference exists between one or more baseline signals previously collected for the ATM and/or stored in memory and the detected signals associated with the ATM. For example, skimmer RF detection server 130 may compare one or more baseline signals associated with the ATM to one or more detected signals associated with the ATM to determine whether one or more differences exists in one or more frequency ranges of the compared signals. As another example, skimmer RF detection server 130 may compare the amplitude(s) of the one or more baseline signals associated with the ATM to the amplitude(s) of the detected signals associated with the ATM to determine whether one or more differences exist in the amplitudes of the compared signals. This comparison may utilize one or more types of displays. For example, RF signals may be visualized and analyzed in various frameworks. The signals may exhibit changes in the time and frequency domains. A common "oscilloscope style" display may show near real-time changes in the amplitude at various frequencies. A "waterfall" display may show similar information but with an added time dimension by showing changing amplitudes as varying colors on a graphical format that has the appearance of a waterfall.

If there are one or more differences between the amplitudes and/or frequencies of the baseline signals and the amplitudes and/or frequencies of the detected signals, skimmer RF detection server 130 may determine whether the differences are present for a predetermined time period (S440). For example, skimmer RF detection server 130 may compare the duration of the detected RF signals measured by the threshold timer to the predetermined time period. In one embodiment, the predetermined time period may be a length of time greater than an average time for a customer to initiate and complete a typical ATM transaction. In one aspect, skimmer RF detection server 130 may receive the predetermined time period from another component, or it may be provided via a user using an input device to program and/or store the predetermined time period data in memory, which is accessible by processor 231 (for example) for subsequent analysis in accordance with these embodiments. In one aspect, the software instructions executed by skimmer RF detection server 130 may include processes that take into account that skimmers are generally present on an ATM until retrieved by a person who implemented the skimmer on the ATM (e.g., a thief). Thus, in one example, skimmer RF detection server 130 may perform processes that determine whether the unidentified RF signals associated with the ATM are emitted for a period of time that is longer than the typical time for typical ATM transactions. For instance, one of ordinary skill in the art would appreciate that skimmers may emit RF signals for a period of time that would be longer, and in some instances significantly longer, than the time it would take a customer to initiate and complete an ATM transaction. Skimmer RF detection server 130 may be configured to account for changes in RF signals based on normal activities by or near a monitored ATM. For example, skimmer RF detection server 130 may be configured to determine whether detected different RF signals are not constant or near constant for the predetermined time period, and if so, may determine that the signals likely have been generated by non-harmful electronic devices passing by the proximity of the ATM, such as a customer's cellular phone. Thus in certain embodiments, if skimmer RF detection server 130 determines that the differences in detected RF signals are not present for a predetermined time period (e.g., step S440; No), skimmer RF detection server 130 may determine that a skimmer is not in place at the ATM (e.g., step S430). In one embodiment, process 400 may then restart the analysis for detecting a skimmer using additional and/or new detected signal information.

However, if skimmer RF detection server 130 determines that the different RF signals associated with the ATM are constant, or near constant, for the predetermined period of time, skimmer RF detection server 130 may determine that the signals were likely generated by a skimmer (e.g., step S440; Yes). Skimmer RF detection server 130 may also be configured to determine whether differences between the amplitude levels and/or the frequencies of the baseline signals and the detected signals are present in multiple frequency ranges during the predetermined time period (e.g., step S450). In one aspect, skimmer RF detection server 130 may be configured to execute software instructions to perform processes that take into account that skimmers generally emit RF signals in multiple frequency ranges and thus determine that it is likely that a skimmer is present at the ATM if multiple frequencies are detected during the predetermined time period.

If skimmer RF detection server 130 determines that the differences between the amplitude levels and/or the frequencies of the baseline signals and the detected signals are present in multiple frequency ranges (e.g., step S450; Yes), skimmer RF detection server 130 may determine whether the frequency emissions match any known skimmer frequencies (step S460). For example, skimmer RF detection server 130 may be configured to perform one or more processes that request or obtain skimmer frequency data from one or more databases, such as known skimmer RF database 234, and compare the detected frequency or combination of frequencies associated with the detected RF signals with the frequency or combination of frequencies of known skimmers stored in known skimmer RF database 234. If the comparison results in a match (e.g., one or more frequencies of the detected RF signals match one or more frequencies of known skimmers), skimmer RF detection server 130 may determine that the detected RF signals are generated by a known skimmer associated with the known skimmer data (e.g., step S470). However, if skimmer RF detection server 130's comparison fails to result in a match, skimmer RF detection server 130 may determine that the detected frequencies are being generated by an unknown skimmer (e.g., step S480). In one embodiment, skimmer RF detection server 130 may store the detected frequencies of the RF signals and information related to the detection (e.g., location information, time information, etc.) in unknown skimmer RF database 236 (e.g., step S490). The disclosed embodiments may later use the updated unknown skimmer frequency data to identify and detect an unknown skimmer based on other detected RF signals for the ATM or another ATM. Moreover, the disclosed embodiments may provide the unknown skimmer frequency data to another component for additional analysis to identify the unknown skimmer based on other characteristics of the detected RF signals.

Almost all skimmer devices, video cameras, and keypad overlays have a three dimensional (3D) shape that alters the appearance of the ATM when installed. Thus, the disclosed embodiments may use the change in the 3D shape of the ATM to detect skimmer devices, video cameras, and keypad overlays present on ATMs. To this end, an exemplary system may be configured to determine one or more baseline 3D images of an ATM and/or determine any differences between the baseline 3D image of the ATM and the 3D image of the ATM with skimmer devices, video cameras, and/or keypad overlays installed. The system may also determine whether skimmer devices, video cameras, and/or keypad overlays are present based on the detected 3D image. For example, the system may compare the detected 3D image to data contained in a known skimmer device, video camera, and/or keypad overlay database to determine whether the detected 3D image matches any known ATM skimmers, video cameras, and/or keypad overlay databases. As another example, the system may also determine that a skimmer, video camera, and/or keypad overlay is present based on the location of the change in the 3D image of the ATM and/or the period of time that the change is detected. As yet another example, the system may also detect motion around the ATM so that 3D images are not captured when motion is detected or for a certain time after motion is detected. By avoiding capturing 3D images of the ATM when motion is detected (e.g., when a customer is using the ATM), false alarms may be reduced.

Figure 5:
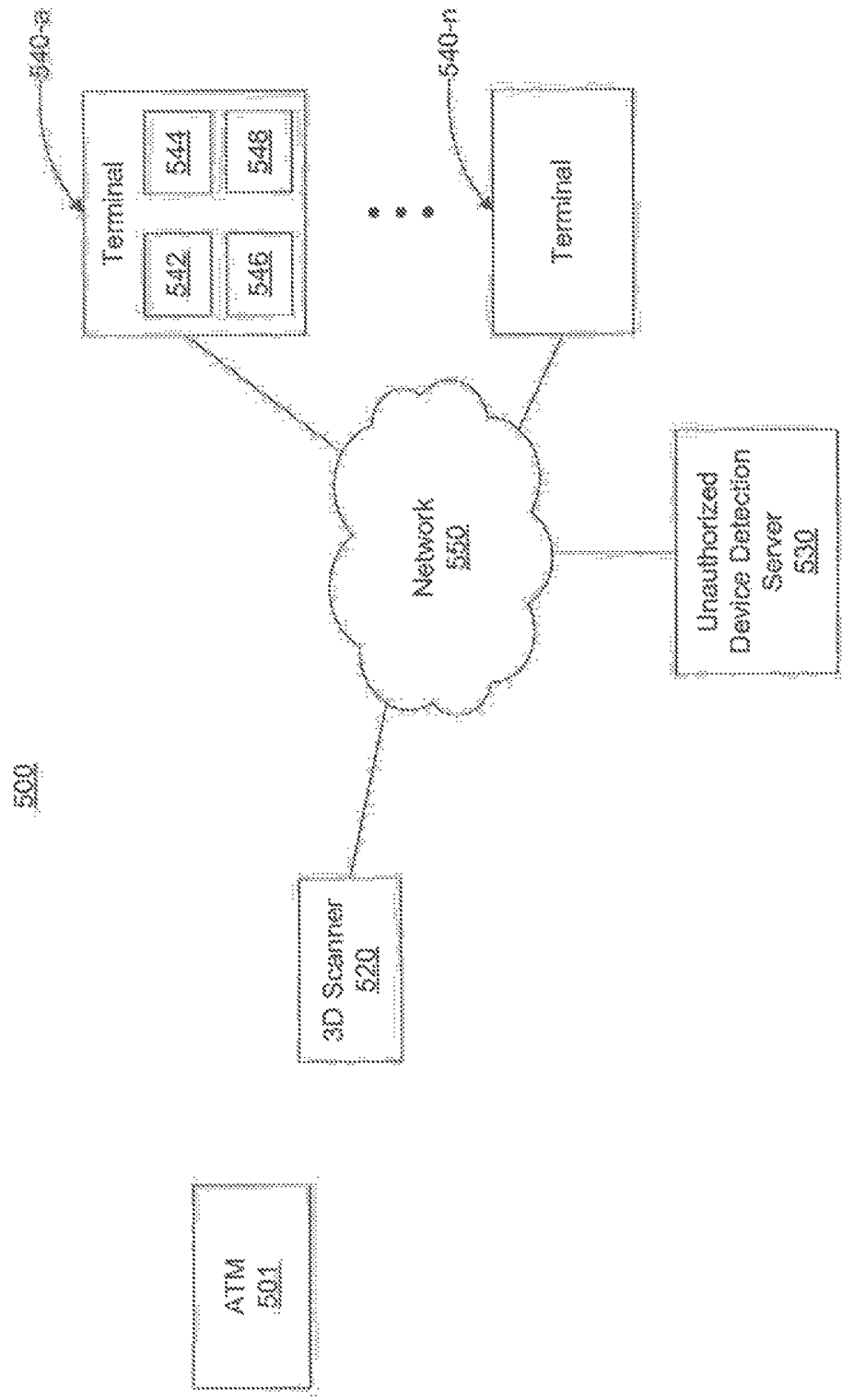
FIG. 5 is a block diagram of exemplary unauthorized device detection system 500 consistent with disclosed embodiments.

FIG. 5 is a block diagram of exemplary unauthorized device detection system 500 consistent with disclosed embodiments. System 500 may be implemented in a number of different configurations without departing from the scope of the disclosed embodiments. In the embodiment shown in FIG. 5, system 500 may include a 3D scanner adapted to transmit and receive light signals for the detection of the 3D shape of an object, e.g., ATM 501. 3D scanner 520 may also be configured with a camera that may be configured, for example, to capture images of objects. 3D scanner 520 may be configured to analyze whether an unauthorized device is present, or it may transmit data for subsequent analysis to unauthorized device detection server 530. System 500 may also include one or more client terminals 540-a to 540-n, and a network 550 for interconnecting one or more of 3D scanner 520, unauthorized device detection server 530, and client terminals 540-a to 540-n. While FIG. 5 shows only one 3D scanner 520 and one unauthorized device detection server 530, system 500 may include any number of 3D scanners 520 and unauthorized device detection servers 530.

3D scanner 520 may be any type of scanner capable of detecting the shape of an object (e.g., the distance various points of an object are from the 3D scanner). 3D scanner 520 may be configured to detect the 3D shape using any suitable technique, for example, light coding, stereo imaging, time-of-flight, etc. In certain embodiments, 3D scanner 520 may be a Kinect™ device. In certain embodiments, 3D scanner 520 may be configured as a 3D camera with a light pattern transmitter (e.g., using infrared light). 3D scanner 520 may be configured to project a pattern of light from the light transmitter onto objects, capture an image of the projected pattern of light, and then translate the distortions in the pattern into a 3D information (e.g., using the distortions to determine the distance of various points in the scene from the 3D camera by comparing the distortions to the known projected pattern). In certain embodiments, 3D scanner 520 may also include a video or photographic camera to capture two dimensional images of the scene, for example, for use in motion detection. The video or photographic camera may comprise an image sensor, e.g., a CMOS or CCD sensor, to capture two dimensional image data with an A/D converter to convert the analog image data into digital pixel data. In certain embodiments, the components of the video or photographic camera may be integrated with the components of the 3D camera (e.g., utilize the same aperture and/or the same processor, etc.).

In certain embodiments, 3D scanner 520 may be configured to transmit the data on the shape of the object (e.g., the depth data) as digital data to unauthorized device detection server 530, e.g., via network 550. In certain embodiments, 3D scanner 520 may be configured to include identification information, such as the time or location of the ATM, with the data on the shape of the object. If configured with a video or photographic camera, 3D scanner 520 may transmit digital pixel data to unauthorized device detection server 530, e.g., via network 550.

Unauthorized device detection server 530 may be a computing system that performs various functions consistent with the disclosed embodiments. In some embodiments, unauthorized device detection server 530 may be configured to process information received from 3D scanner 520. For example, unauthorized device detection server 530 may perform analyses on the data to determine whether an unauthorized device is present. As another example, unauthorized device detection server 530 may capture one or more data packets transmitted by 3D scanner 520 and decode the packets' raw data, such as the identification information related to the ATM. Unauthorized device detection server 530 may also generate and send one or more alerts to one or more of client terminals 540-a through 540-n. An exemplary embodiment of unauthorized device detection server 530 is described further with respect to FIG. 6 and related text, and certain functions that may be performed by unauthorized device detection server 530 are described in greater detail below with respect to, for example, FIGS. 7-8.

Each client terminal 540 may be a computing system operated by a user. In one example, client terminal 540 may be a computing device configured to perform one or more operations consistent with certain disclosed embodiments. For example, terminal 540 may be configured to generate and/or display alerts indicating that an unauthorized device has been detected on one or more ATMs. Terminal 540 may be a desktop computer, a laptop, a server, a mobile device (e.g., tablet, smart phone, etc.), and any other type of computing device. Client terminal 540 may include one or more processors configured to execute software instructions stored in memory. The disclosed embodiments are not limited to any particular configuration of client terminal 540. For instance, as shown in FIG. 5 (for simplicity, in terminal 540-*a* only), client terminal 540 may include, for example, a processor 542, a memory 544, a display device 546, and an interface device 548. Processor 542 may be one or more processor devices, such as a microprocessor, or other similar processor device(s) that executes program instructions to perform various functions. Memory 544 may be one or more storage devices that maintain data (e.g., instructions, software applications, etc.) used and/or executed by processor 542. Display device 546 may be any known type of display device that presents information to a client operating terminal 540. Interface device 548 may be one or more known interface device modules that facilitate the exchange of data between the internal components of client terminal 540 and external components, such as unauthorized device detection server 530. In one embodiment, interface device 548 may include a network interface device that allows client terminal 540 to receive and send data to and from network 550.

Network 550 may be any type of network that facilitates communication between remote components, such as unauthorized device detection server 530 and terminals 540-*a* to 540-*n*. For example, network 550 may be a local area network (LAN), a wide area network (WAN), a virtual private network, a dedicated intranet, the Internet, and/or a wireless network.

The arrangement illustrated in FIG. 5 is exemplary and system 500 may be implemented in a number of different configurations without departing from the scope of the disclosed embodiments. For example, components 520 and 530 may be connected through other communication link(s), as opposed to being connected via network 550. In certain embodiments, components 520 and 530 may be housed in the same device. Further additional components may be included in system 500, such as a connection to other unauthorized device detection systems (e.g., skimmer detection systems) that may provide information to unauthorized device detection server 530. Moreover, one or more of components 510, 520, 530, 540, and/or 550 may be included in a single device or various combinations of devices.

Figure 6:
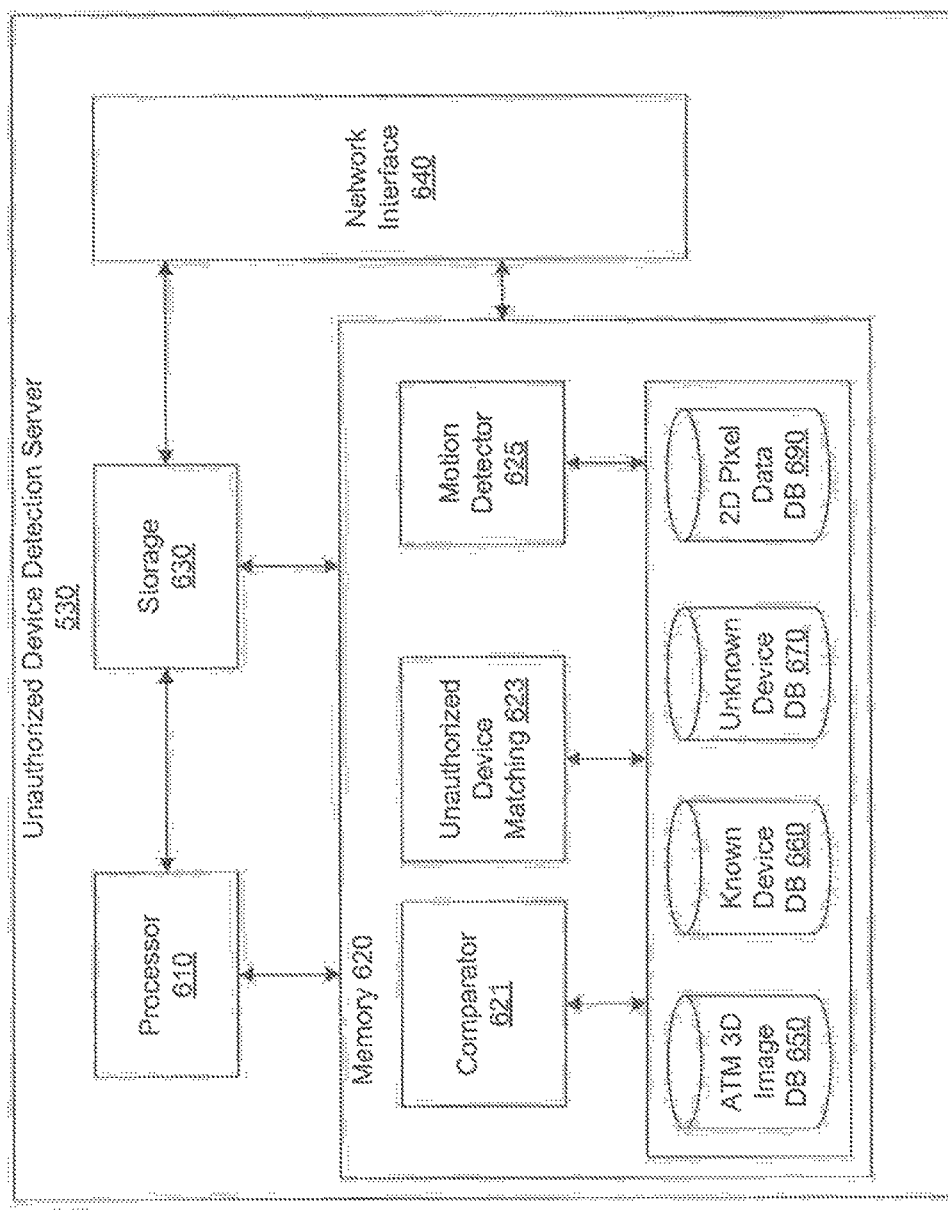
FIG. 6 is a block diagram of exemplary unauthorized device detection server 530 consistent with disclosed embodiments.

FIG. 6 is a block diagram of exemplary unauthorized device detection server 530 consistent with disclosed embodiments. Unauthorized device detection server 530 may be implemented in various ways. For example, unauthorized device detection server 530 may be a special purpose computer, a server, a mainframe computer, a computing device executing software instructions that receive and process information and provide responses, or any combination of those components. In one example, as shown in FIG. 6, unauthorized device detection server 530 may include a processor 610, a memory 620, storage 630, a network interface 640, and input/output (I/O) devices (not shown).

Processor 610 may include one or more processors, such as known processing devices, microprocessors, etc. configured to execute instructions to perform operations. Memory 620 may include one or more storage devices configured to store information used and/or executed by processor 610 to perform one or more operations related to disclosed embodiments. Storage 630 may include volatile or non-volatile, magnetic, semiconductor, tape, optical, removable, nonremovable, or any other type of storage device or tangible computer-readable medium.

In some embodiments, memory 620 may include software instructions that when executed by processor 610, perform operations consistent with disclosed embodiments. For example, memory 620 may include software instructions that when executed perform one or more unauthorized device detection processes consistent with disclosed embodiments. In one example, memory 620 may include comparator program 621, unauthorized device matching program 623, and motion detector program 625. In one embodiment, programs 621, 623, and 625 may be loaded from storage 630 or another source component that, when executed by unauthorized device detection server 530, perform various procedures, operations, and/or processes consistent with disclosed embodiments.

For example, memory 620 may include a comparator program 621 that performs operations that may determine one or more differences between one or more baseline 3D images of a monitored ATM and a current 3D image of an ATM (e.g., based on data stored in ATM 3D image database 650) and, based on the detected differences, determine whether an unauthorized device is present on the ATM. In certain embodiments, comparator program 621 may be configured to compare only certain areas of the monitored ATM to determine if unauthorized devices are present on the ATM (e.g., comparing the area near the card reader, the keyboard area, and/or likely locations of hidden cameras). In certain aspects, comparator program 621 may be programmed with one or more difference threshold levels for detected differences. For example, comparator program 621 may be programmed with baseline depth/shape data that is associated with variances such that only differences that exceed the expected variances or that are statistically significant are considered differences that indicate the presence of an unauthorized device and/or possible damage to the ATM. As another example, the threshold level for detecting differences that indicate the presence of an unauthorized device and/or possible damage to the ATM may be set, for example, by a device or component manufacturer, by a wireless network operator, by a user of unauthorized device detection server 530, and/or by a user of terminal 540.

In certain embodiments, comparator program 621 may be configured to treat differences detected in certain locations differently from differences noted in other locations. For example, comparator program 621 may be configured to send information on a potential unauthorized device for further processing by unauthorized device matching program 623 (or may send an unauthorized device alert to terminal 540) if a difference is located near the card reader, the keyboard area, and/or likely locations of hidden cameras, and comparator program 621 may be configured to send a possible damage alert to differences located at other areas of the ATM. In some embodiments, comparator 621 may be configured to transmit alerts and other data regarding the comparison analysis and the monitored ATM to client terminal 540. In some embodiments, comparator 621 may be configured to transmit alerts and other data regarding the monitored ATM to unauthorized device matching program 623 for further analysis.

In some embodiments, memory 620 may include unauthorized device matching program 623 that may compare information about potential unauthorized devices to information for known unauthorized devices. For example, if comparator program 621 sends depth/shape data for a potential unauthorized device, unauthorized device matching program 623 may compare the received depth/shape data to the depth/shape data of known unauthorized devices (e.g., stored in known device database 660) to determine if the detected unauthorized device matches a known unauthorized device. In certain embodiments, if two-dimensional images are available for the monitored ATM, unauthorized device matching program 623 may compare two dimensional images of the potential unauthorized device to a database of two dimensional images of known devices to determine if the detected device is a known unauthorized device. For example, unauthorized device matching program 623 may use the location data for a potential unauthorized device detected by comparator 621, locate the corresponding pixel data obtained by a photographic or video camera (e.g., if 3D scanner 520 were configured with a photographic or video camera), and compare the two-dimensional pixel data with a database of two-dimensional images of known unauthorized devices. In certain embodiments, unauthorized device matching program 623 may be configured to transmit an unauthorized device alert and other information about the analysis and/or the monitored ATM to terminal 540 whether or not the device is matched to a known device, but unauthorized device matching program 623 may indicate that the device is a known device if the information about the device matches the information for a known device (e.g., matches information stored in known device database 660).

In some embodiments, memory 620 may include motion detector program 625. Motion detector program 625 may detect motion or object moving based on two dimensional images of the scene, e.g., using video motion detection methods. In certain embodiments, video motion or object detection may be determined by motion detector program 625 using 2D pixel data database 660, which may store digital pixel information transmitted from 3D scanner 520 (e.g., if 3D scanner 520 is configured with a video or photographic camera). Video motion detection may be performed using any method known in the art. In certain embodiments, motion detector program 625 may use other data (not shown) to detect motion. For example, system 500 may be configured with a motion detector (not shown) that transmits data to motion detector 625 for analysis to determine if motion is present in the scene. The motion detector may be a passive infra-red (PIR) detector, a laser or other tripwire detector, an ultrasonic detector, etc. One of ordinary skill in the art would understand the types of detectors that could be used to detect motion. In certain embodiments, when motion detector program 625 determines that motion has been detected, it may directly or indirectly notify and/or cause comparator program 621 and/or unauthorized device matching program 623 to pause or otherwise stop any analyzing of the ATM for unauthorized devices. For example, when a person is using the ATM, motion detector program 625 may determine that there is motion in the scene and halt the processes for detecting unauthorized devices (halt the operations of comparator program 621 and/or unauthorized device matching program 623) until the motion is no longer detected. In certain embodiments, when motion detector 625 detects motion, it may directly or indirectly pause or otherwise stop alerts from comparator program 621 and/or unauthorized device matching program 623 from being transmitted to client terminal 540. In certain embodiments, when motion detector 625 detects motion, it may transmit a signal to halt 3D scanner 520 from scanning ATM 501 or from transmitting scanned information to unauthorized device detection server 530. One of ordinary skill in the art would understand advantageous implementations of motion detection that would halt the search for unauthorized devices. By using motion detection to determine when a person or other object is moving in the scene, false alarms may be reduced or eliminated.

Memory 620 may also include other programs that perform other functions and processes, such as programs that provide communication support, Internet access, database access, and the like. Memory 620 may also include one or more interconnected information storage databases, such as, for example, ATM 3D image database 660, known device database 660, unknown device database 670, and 2D pixel data database 690. The information storage databases can be populated by any known methods. For example, server 530 may populate known device database 660 by receiving one or more database entries from another component, a wireless network operator, or a user of server 530 and/or terminal 540, and storing the database entries into memory 620. The database entries can contain a plurality of fields, one or more of which may include information related to known devices, such as, for example, device names, the shape of the device, the color of the device, one or more images of the skimmer device, information related to disabling the particular device, and the like. While in the embodiment shown in FIG. 6 the information storage databases are interconnected, each information storage database need not be interconnected. Moreover, rather than separate databases, server 530 may include only one database that includes the data of databases 650, 660, 670, and 690. Memory 620, in conjunction with processor 610, may also be capable of accessing, creating and/or otherwise managing data remotely through network 550.

Methods, systems, and articles of manufacture consistent with disclosed embodiments are not limited to separate programs or computers configured to perform dedicated tasks. For example, memory 620 may be configured with comparator program 621 that performs several processes when executed by processor 610. For example, memory 620 may include a single program 621 that performs the functions of the device detection system, or program 621 could comprise multiple programs. Moreover, processor 610 may execute one or more programs located remotely from server 530. For example, sever 530 may access one or more remote programs that, when executed, perform functions related to disclosed embodiments.

Memory 620 may also be configured with an operating system (not shown) that performs several functions well known in the art when executed by server 530. By way of example, the operating system may be Microsoft Windows, Unix, Linux, Apple Computer operating systems, or some other operating system. The choice of operating system, and even the use of an operating system, is not critical to any embodiment.

Unauthorized device detection server 530 may include one or more I/O devices (not shown) that allow data to be received and/or transmitted by unauthorized device detection server 530. I/O devices may also include one or more digital and/or analog communication input/output devices that allow unauthorized device detection server 530 to communicate with other machines and devices, such as terminals 540-*a* to 540-*n*. The configuration and number of input and/or output devices incorporated in I/O devices may vary as appropriate for certain embodiments.

Figure 7:
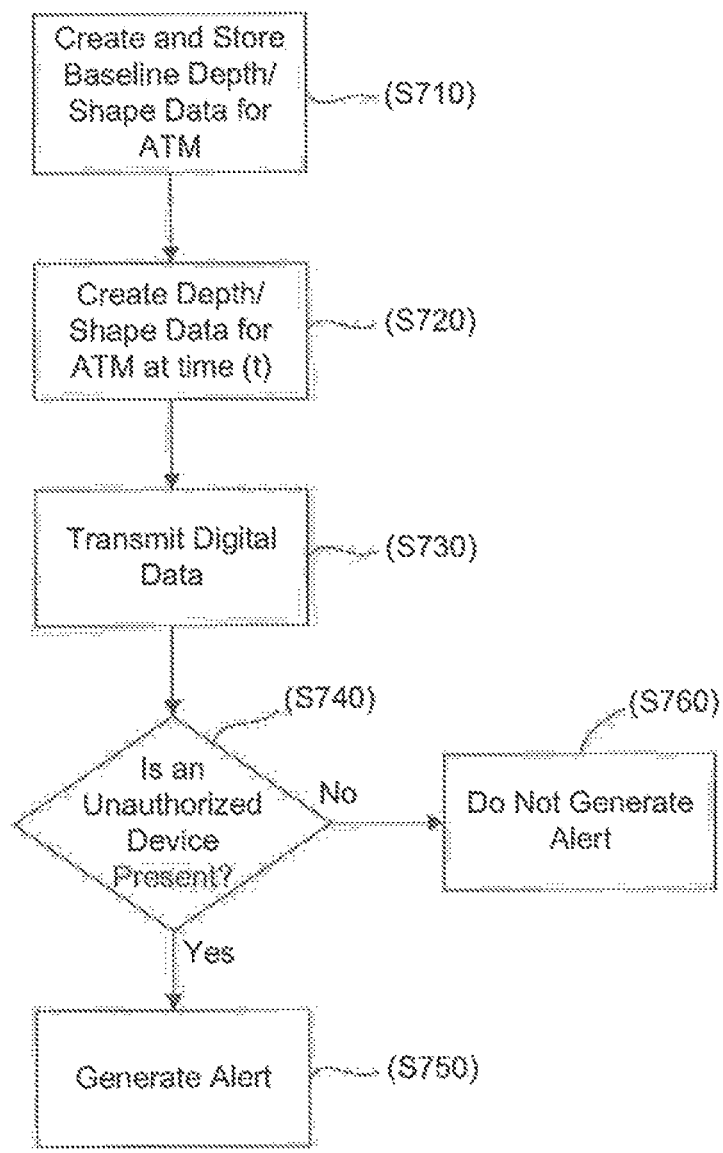
FIG. 7 is a flow chart demonstrating exemplary process 700 for detecting unauthorized devices on ATMs based on 3D image analysis consistent with disclosed embodiments.

FIG. 7 is a flow chart demonstrating exemplary process 700 for detecting unauthorized devices on ATMs based on 3D image analysis consistent with disclosed embodiments. In certain aspects, one or more operations of unauthorized device detection process 700 may be performed by unauthorized device detection server 530. One or more operations of process 700 may be performed by other components of system 500, such as 3D scanner 520, etc. In one embodiment, unauthorized device detection server 530 may execute software instructions to perform operations of process 700 to detect one or more unauthorized devices that may be present on one or more ATMs. In one example, 3D scanner 520 may take a baseline scan of the shape of ATM 501 and transmit the scan to unauthorized device detection server 530, where unauthorized device detection server 530 may convert the scan information into digital data regarding the baseline depth/shape of the ATM and store the digital data as the baseline image data (S710). For example, 3D scanner 520 may capture the reflection of a pattern of light projected by 3D scanner 520 onto ATM 501, and transmit captured reflected light pattern to unauthorized device detection server 530. Unauthorized device detection server 530 may use the distortions in the captured reflected light to determine the depth/shape data for ATM 501 and store that data for later comparison.

3D scanner 520 may then scan ATM 501 at a later time (e.g., at time (t)) and transmit that data to unauthorized device detection server 530, where unauthorized device detection server 530 may convert the scan information into digital data for ATM 501 at time (t) (S720). 3D scanner 520 may be configured to scan ATM 501 at regular intervals (e.g., every second, every minute, each day at 9 am, etc.), or it may be configured to constantly scan and transmit data to ATM 501. 3D scanner 520 may also be configured to suspend scanning ATM 501 if motion is detected (e.g., if motion detector 625 transmits information to 3D scanner 520 that motion has been detected), and 3D scanner 520 may be configured to resume scanning ATM 501 once motion is no longer detected.

Unauthorized device detection server 530 may receive and store the digital data for the baseline ATM depth/shape information and the depth/shape information at time (t) in one or more memories, such as in ATM 3D image database 650 of memory 620. Unauthorized device detection server 130 may execute software instructions that perform operations to determine whether or not a skimmer is present on the ATM (S740). This determination is described in further detail with respect to FIG. 8. If unauthorized device detection server 530 determines that an unauthorized device is present, unauthorized device detection server 530 may generate an alert (S750). In one embodiment, unauthorized device detection server 530 may be configured to generate and provide an alert to one or more terminals 540-*a* to 540-*n*. In certain aspects, unauthorized device detection server 530 may be configured to generate an alert to include information associated with characteristics of the unauthorized device, the identity of the ATM where the unauthorized device was detected, etc. In certain aspects, 3D scanner 520 may provide identification information associated with the ATM 501.

In one embodiment, unauthorized device detection server 530 may be configured to determine the type of detected unauthorized device. For example, unauthorized device detection server 530 may perform operations that determine whether the detected unauthorized device has one or more characteristics that match those of a known type of unauthorized device through analysis of information stored in known device database 660. In such instances, unauthorized device detection server 530 may generate an alert such that it includes unauthorized device related information obtained, for example, from known device database 660. For example, if unauthorized device detection server 530 has detected an unauthorized device, unauthorized device detection server 530 may query known device database 660 to match the detected device to database entries of known devices in the known device database 660. If unauthorized device detection server 530 determines a match between the detected device and a database entry, unauthorized device detection server 530 may populate an alert template with information contained in the matching database entry and/or with information linked to the matching database entry. For example, in some embodiments, unauthorized device detection server 530 may generate the alert such that it may include one or more images (e.g., digital picture, or the like) of the detected device, information about how to remove, disable, etc. the device, and the like. In certain embodiments, if unauthorized device detection server 530 has determined the detected device is an unknown device, unauthorized device detection server 530 may generate information in the alert that provides directions on how a user may populate unknown device database 670 with information related to the unknown skimmer (e.g., how to input information related to depth/shape or image information for the particular device, how to create and/or upload one or more images and/or depth/shape information for the particular device, how the user disabled the particular device, and the like).

In certain aspects, if unauthorized device detection server 530 determines that a device is not present (step 7340; No), unauthorized device detection server 530 may not generate an alert (S760).

The disclosed embodiments may implement process 700 such that the disclosed embodiments may monitor a plurality of ATMs 501 to determine whether one or more unauthorized devices are present on the ATMs 501. In certain aspects, the disclosed embodiments may be configured to generate and store data related to multiple unauthorized devices detected at respective ATMs 501, at a central location, such as unauthorized device detection server 530. For example, system 500 may be configured to use data gathered from a plurality of ATMs 501 to identify unauthorized devices (e.g., new, known, etc.) and store that data for use by unauthorized device detection server 530 or by another computing component that may be in communication with unauthorized device detection server 530.

Figure 8:
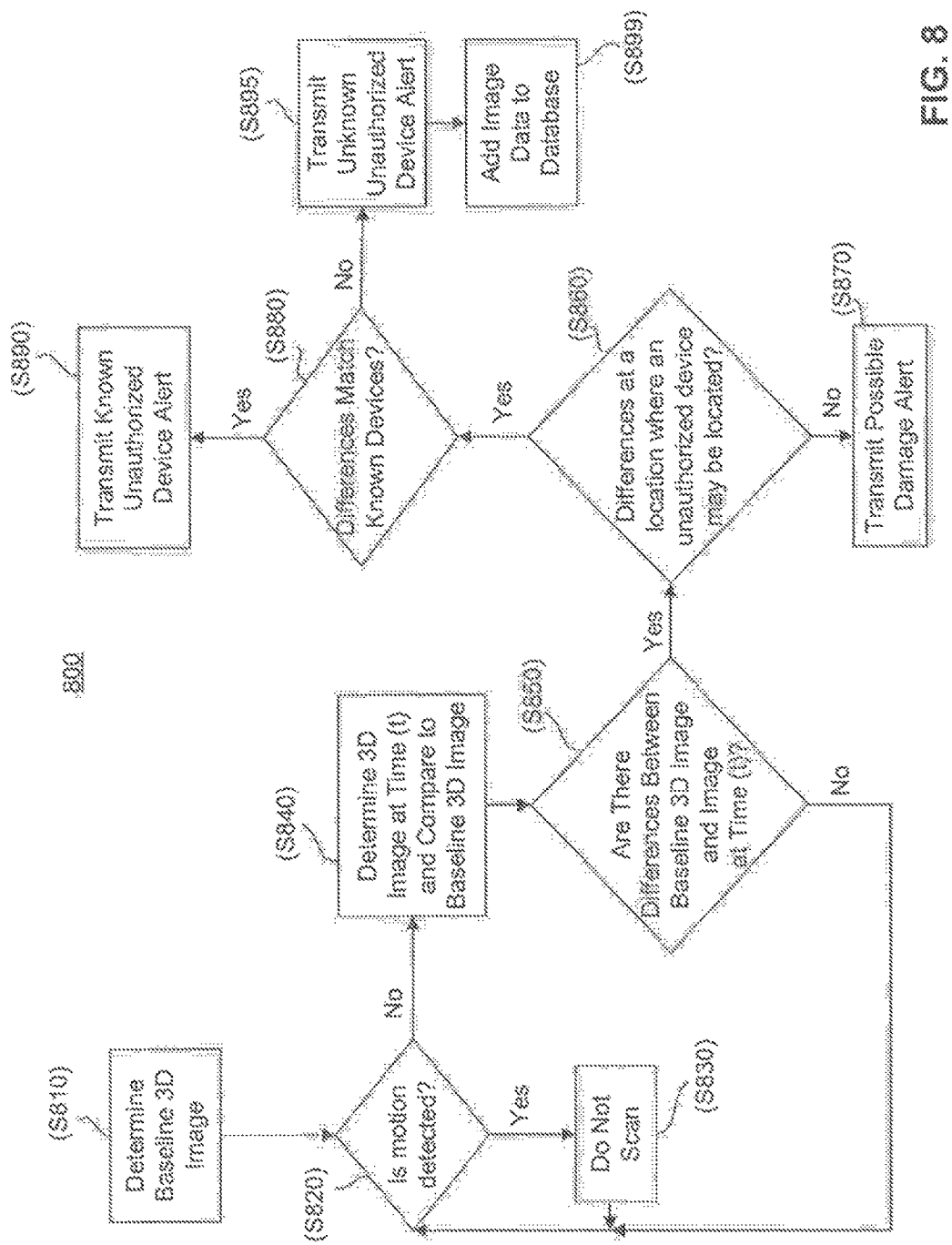
FIG. 8 is a flow chart demonstrating exemplary 3D image analysis process 800 consistent with disclosed embodiments.

FIG. 8 is a flow chart demonstrating exemplary 3D image analysis process 800 consistent with disclosed embodiments. In one embodiment, unauthorized device detection server 530 may be configured to execute one or more operations of process 800 to analyze differences between baseline 3D image (e.g., depth/shape) data and 3D image data detected at a later time. In certain aspects, process 800 may relate to the processes associated with operation S740 of FIG. 7. In certain embodiments, unauthorized device detection server 530 may execute one or more algorithms to determine one or more baseline 3D images of ATM 501 (S810). For example, unauthorized device detection server 530 may execute algorithms that may establish baseline depth/shape data with confidence intervals for normal depth/shape readings. New 3D images may be compared against that baseline and any readings that are statistically different from the baseline shape/depth data may be flagged for additional analysis. Over time, false alarms may be cataloged for future identification and to minimize further false alarms. Unauthorized device detection server 530 may also provide instructions to 3D scanner 520 to collect baseline scans of ATM 501 during a predetermined period of time when there is no interference from moving objects, such as when the ATM is first installed and when no person or object is moving in the scene. Unauthorized device detection server 530 may store the baseline scan information in one or more local or remote databases, such as, for example, databases located in memory 620. In some embodiments, unauthorized device detection server 530 may receive the depth/shape information for the baseline 3D image from another component, or it may be set, for example, by a device or component manufacturer, by a wireless network operator, or by a user of unauthorized device detection server 530 and/or terminal 540 using an input device. In certain embodiments, unauthorized device detection server 530 may determine the particular type of ATM being monitored based on the identification information transmitted by 3D scanner 520 to unauthorized device detection server 530. Unauthorized device detection server 530 may also compare the type of ATM being monitored to one or more entries within the database to identify one or more database entries that match the type of ATM being monitored and may use the matching database entries to determine the baseline depth/shape data for the particular ATM.

Unauthorized device detection server 530 may determine if motion is detected based on, for example, an analysis of two-dimensional image data transmitted by 3D scanner 520 (e.g., if 3D scanner 520 is configured with a video or photographic camera), or data transmitted from a motion detector (S820). If motion is detected (S820; Yes), then unauthorized device detection server 530 may transmit a signal to 3D scanner 520 that will stop or delay 3D scanner from scanning ATM 501 (S830). Processes S820 and S830 may continue until motion is no longer detected (e.g., until S820; No). When motion is not detected (or no longer detected), 3D scanner 520 may scan ATM 501 at time (t) and transmit the information to unauthorized device detection server 530 for further analysis. Unauthorized device detection server 530 may convert the data received from 3D scanner 520 into digital data to determine a 3D image with depth/shape data for the ATM at time (t) and compare that data to the baseline 3D image data (S840). If no differences are detected from the comparison, or if the differences detected are not statistically significant or do not exceed a threshold set by the user for detecting a difference, (S850; No), then unauthorized device detection server 530 may not transmit any alerts, or may transmit a no problems detected alert to client terminal 540. Processes S820-S850 may continue until a difference is detected (or a difference that is statistically significant or exceeds the threshold set by the user) (e.g., until S850; Yes).

When a sufficient difference is detected; unauthorized device detection server 530 may be configured to determine whether the difference is located near the card reader, near the keypad, near a known unauthorized video camera location, or at any location where an unauthorized device may be located (S860). If the difference is not located where an unauthorized device may be located (S860; No), then unauthorized device detection server 530 may be configured to transmit a possible damage alert to client terminal 540 (S870). If the differences are located where an unauthorized device may be located (S860; Yes), then unauthorized device detection server 530 may be configured to attempt to match the depth/shape data and/or image data corresponding to the location of the detected device to known depth/shape and/or image data (S880). If the data for the detected device matches data for a known device (e.g., data stored in known device database 660) (S880; Yes), then unauthorized device detection server 530 may be configured to transmit a known unauthorized device alert to client terminal 540. If the differences do not match a known unauthorized device (S880; No), unauthorized device detection server 530 may be configured to transmit an unknown unauthorized device alert to client terminal 540 (S895). Unauthorized device detection server 530 may also be configured to store the 3D image data and/or two-dimensional image data for the unknown unauthorized device (e.g., stored the data in unknown device database 670). The disclosed embodiments may provide the unknown depth/shape data to another component for additional analysis to identify the unknown device. In certain embodiments, some or all of the alerts (e.g., the no problem alerts, possible damage alerts, known unauthorized device alerts, and/or unknown unauthorized device alerts) may be transmitted with information related to the detection (e.g., location of the ATM information, location of the differences detected on the ATM information, images of the ATM or the detected device, time information, etc.).

Figure 9:
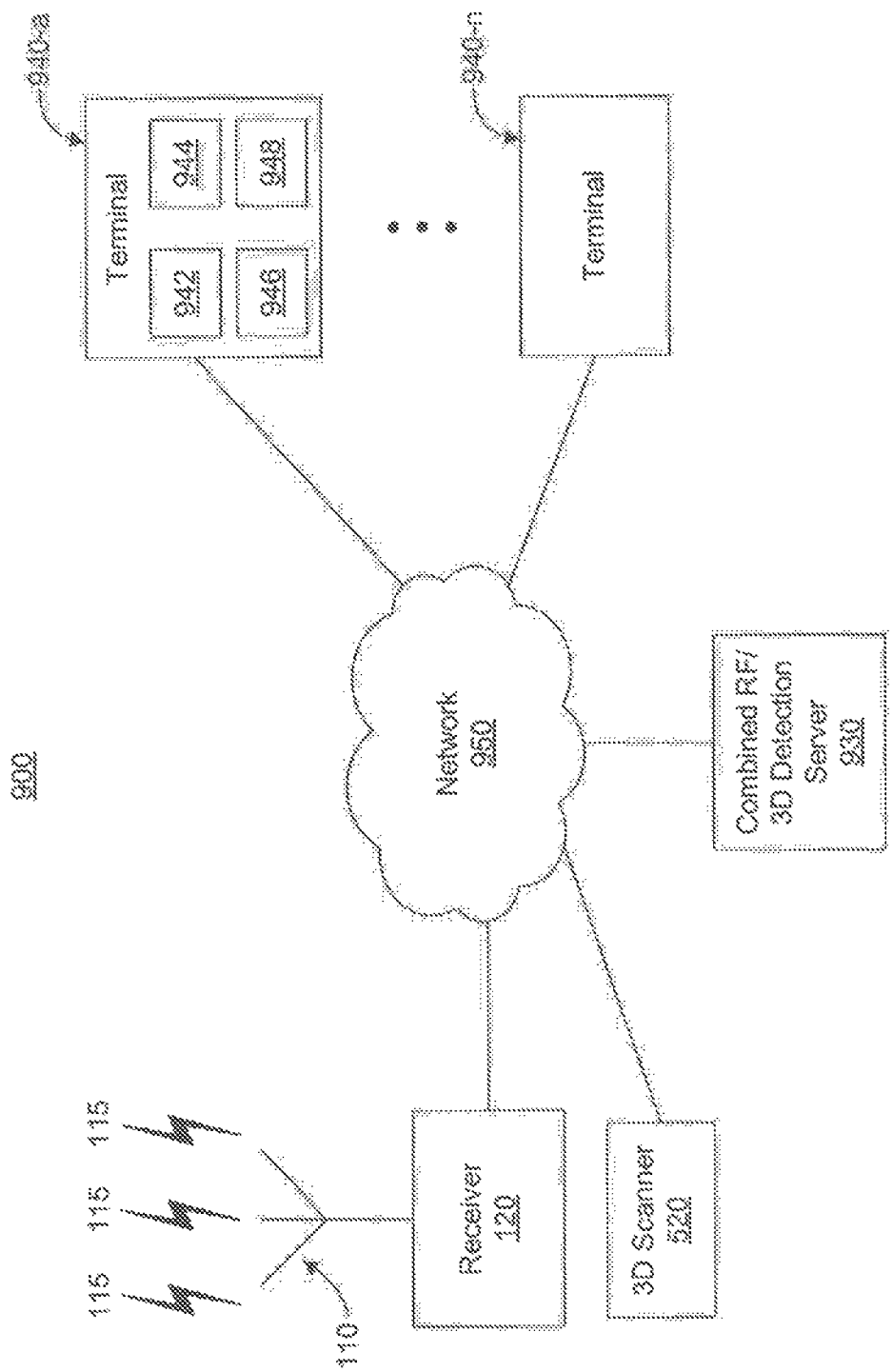
FIG. 9 is a block diagram of exemplary combined RF/3D unauthorized device detection system 900 consistent with disclosed embodiments.

FIG. 9 is a block diagram of exemplary combined RF/3D detection system 900, consistent with disclosed embodiments. System 900 may be implemented in a number of different configurations without departing from the scope of the disclosed embodiments. In the embodiment as shown in FIG. 9, system 900 may comprise signals 115, antenna 110, and receiver 120, as described above with respect to FIG. 1. System 900 may also comprise 3D scanner 520, as described above with respect to FIG. 5. System 900 may also comprise network 950 and terminals 940-*a* to 940-*n*, which are consistent with and provide the functionalities described above with respect to networks 150 and 550 and terminals 140-*a* to 140-*n* and 540-*a* to 540-*n*. Combined RF/3D detection server 930 may be consistent with and provide the functionalities described above with respect to skimmer RF detection server 130 of FIGS. 1 and 2 and unauthorized device detection server 530 of FIGS. 5 and 6. Combined RF/3D detection server 930 is described further with respect to FIG. 10 below.

Figure 10:
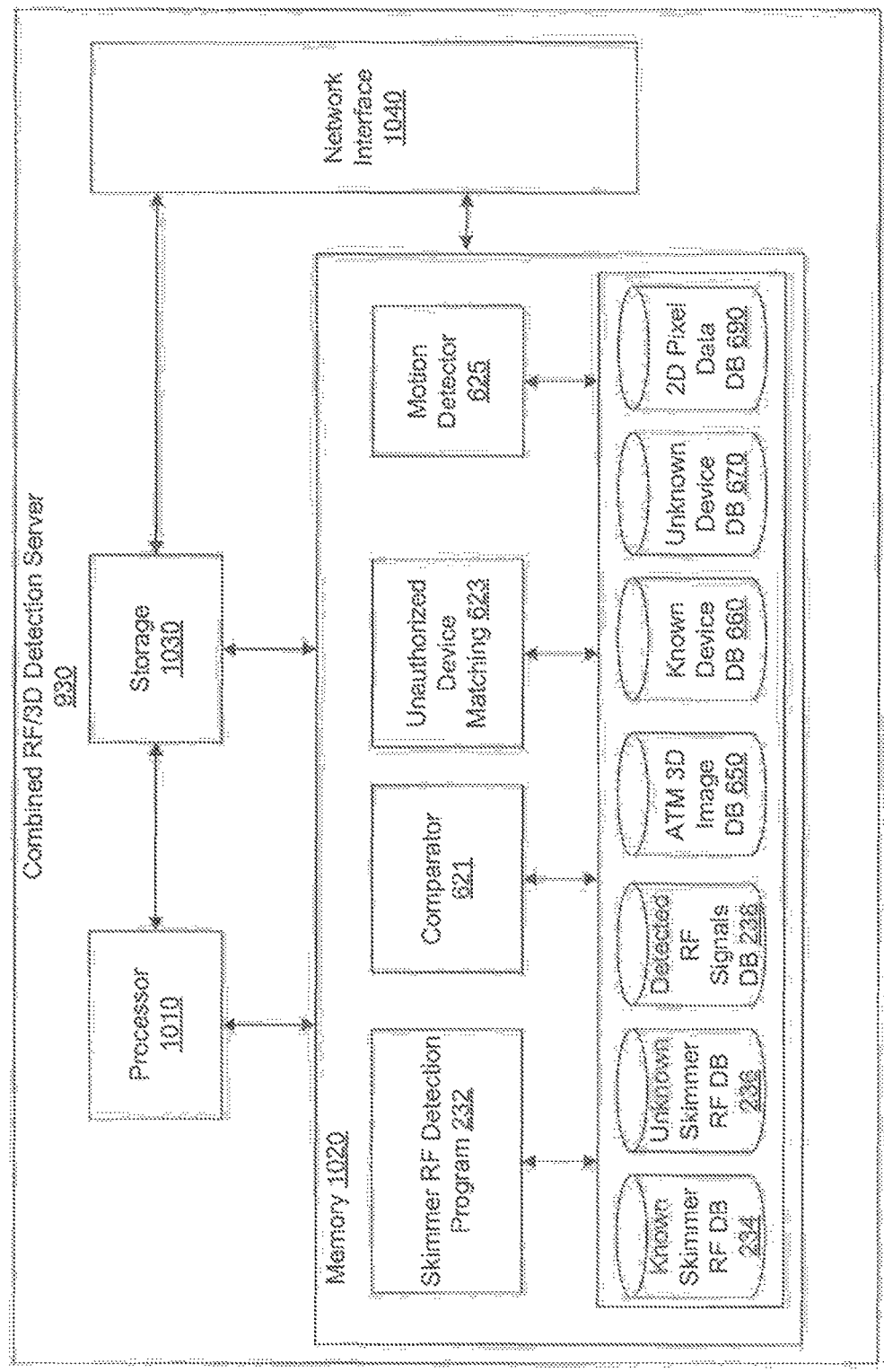
FIG. 10 is a block diagram of exemplary combined RF/3D detection server 930 consistent with disclosed embodiments.

FIG. 10 is a block diagram of exemplary combined RF/3D detection server 930 consistent with disclosed embodiments. As shown in the embodiment provided in FIG. 10, the combined RF/3D detection server 930 may comprise processor 1010, memory 1020, storage 1030, and network interface 1040, which are consistent with and provide similar functionalities to processors 231 and 610, memories 233 and 620, storage 235 and 630, and network interfaces 237 and 640. Memory 1020 may comprise skimmer RF detection program 232 and associated known skimmer RF database 234, unknown RF database 236, and detected RF signals database 236, as described above with respect to FIG. 2. Memory 1020 may also comprise comparator program 621, unauthorized device matching program 623, and motion detector program 625 and associated ATM 3D image database 650, known device database 660, unknown device database 670, and 2D pixel data database 690, as described above with respect to FIG. 6.

In addition to the functionalities described above with respect to skimmer RF detection server 130 and unauthorized device detection server 530, combined RF/3D detection server may be configured to create combined detection processes. Examples of exemplary combined detection processes are provided in FIGS. 11-12.

Figure 11:
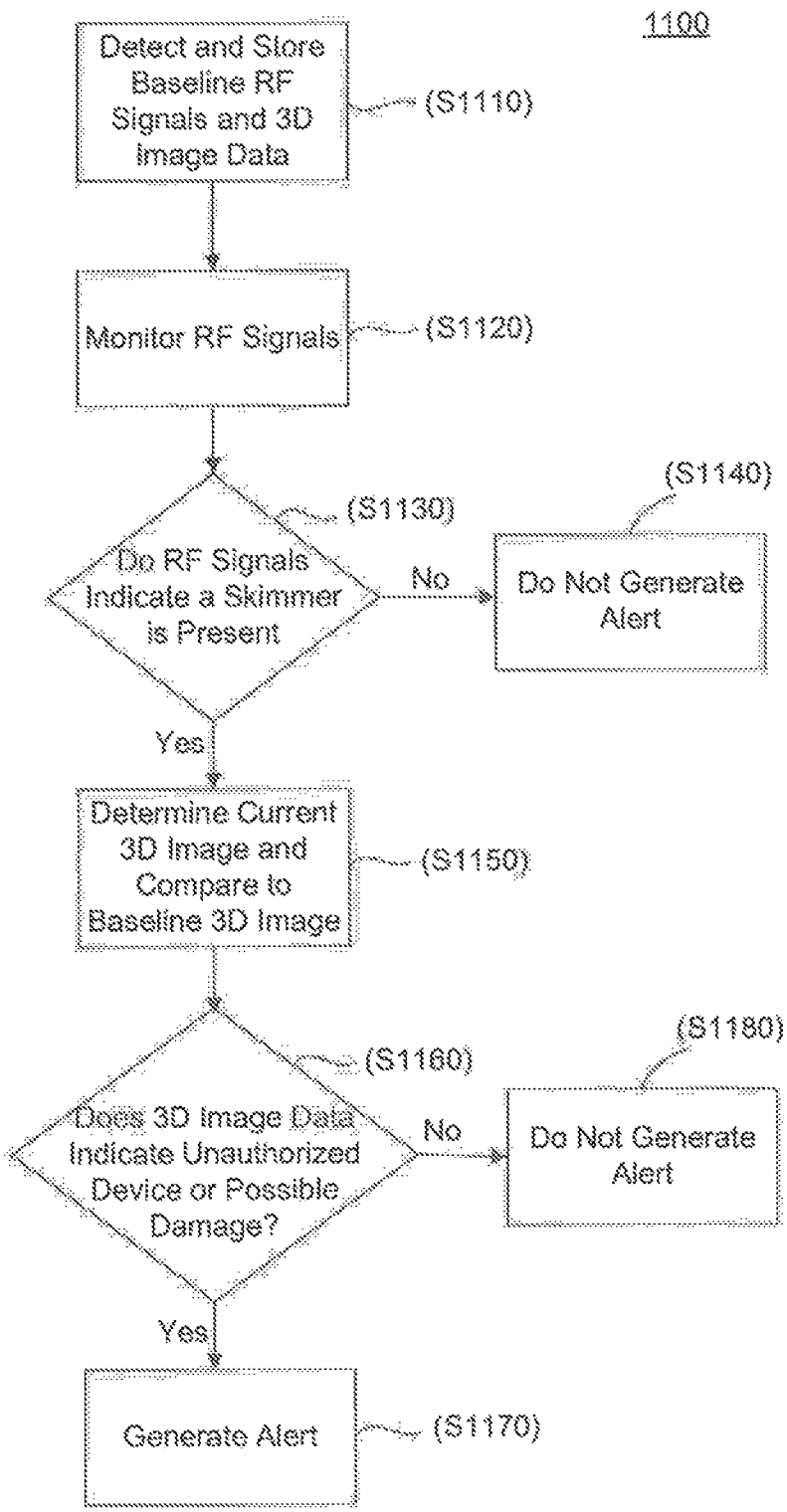
FIG. 11 is a flow chart demonstrating exemplary process 1100 for detecting unauthorized devices on ATMs, including ATM skimmers, and/or possible damage to ATMs based on RF and 3D detection consistent with disclosed embodiments.

FIG. 11 is a flow chart demonstrating exemplary process 1100 for detecting unauthorized devices on ATMs, including ATM skimmers, and/or possible damage to ATMs based on RF and 3D detection consistent with disclosed embodiments. In certain aspects, one or more operations of combined RF/3D detection process 1100 may be performed by combined RF/3D detection server 930. One or more operations of process 1100 may be performed by other components of system 900, such as receiver 120, 3D scanner 520, etc. In one embodiment, combined RF/3D detection server 930 may execute software instructions to perform operations of process 1100 to detect one or more skimmer and/or unauthorized devices that may be present on one or more ATMs. After detecting and storing baseline RF signals and 3D image data (S1110), combined RF/3D detection server 930 may be configured to monitor RF signals (S1120), for example, using processes consistent with those described with respect to FIGS. 3 and 4. If RF signals indicating a skimmer is present are not detected by combined RF/3D detection server 930 (S1130; No), no alert may be generated (S1140), and combined RF/3D detection server 930 may continue to monitor RF signals (e.g., S1120). If combined RF/3D detection server 930 detects RF signals that indicate a skimmer is present, combined RF/3D detection server 930 may be configured to determine the current 3D image of the monitored ATM and compare the current depth/shape data to the baseline 3D image data for the ATM (S1150), for example, using processes consistent with those described with respect to FIGS. 7 and 8. If the differences in the 3D image data indicates an unauthorized device or possible damage may be present (S1160; Yes), an alert may be generated (S1170) and transmitted to client terminal 940. If the 3D image data does not indicate an unauthorized device or possible damage present (S1160; No), no alert may be generated (S1180). In certain embodiments, if the RF signals indicate that a skimmer may be present but the 3D image data does not indicate an unauthorized device is present, an alert may be generated indicating that only RF signals indicate a skimmer is present. One of ordinary skill in the art would understand the various alerts that would be advantageous for combined RF/3D detection server 930 to generate and transmit. In addition, alerts may be transmitted with other information about the detection (e.g., location of the ATM information, one or more images of the ATM, time information, etc.).

Figure 12:
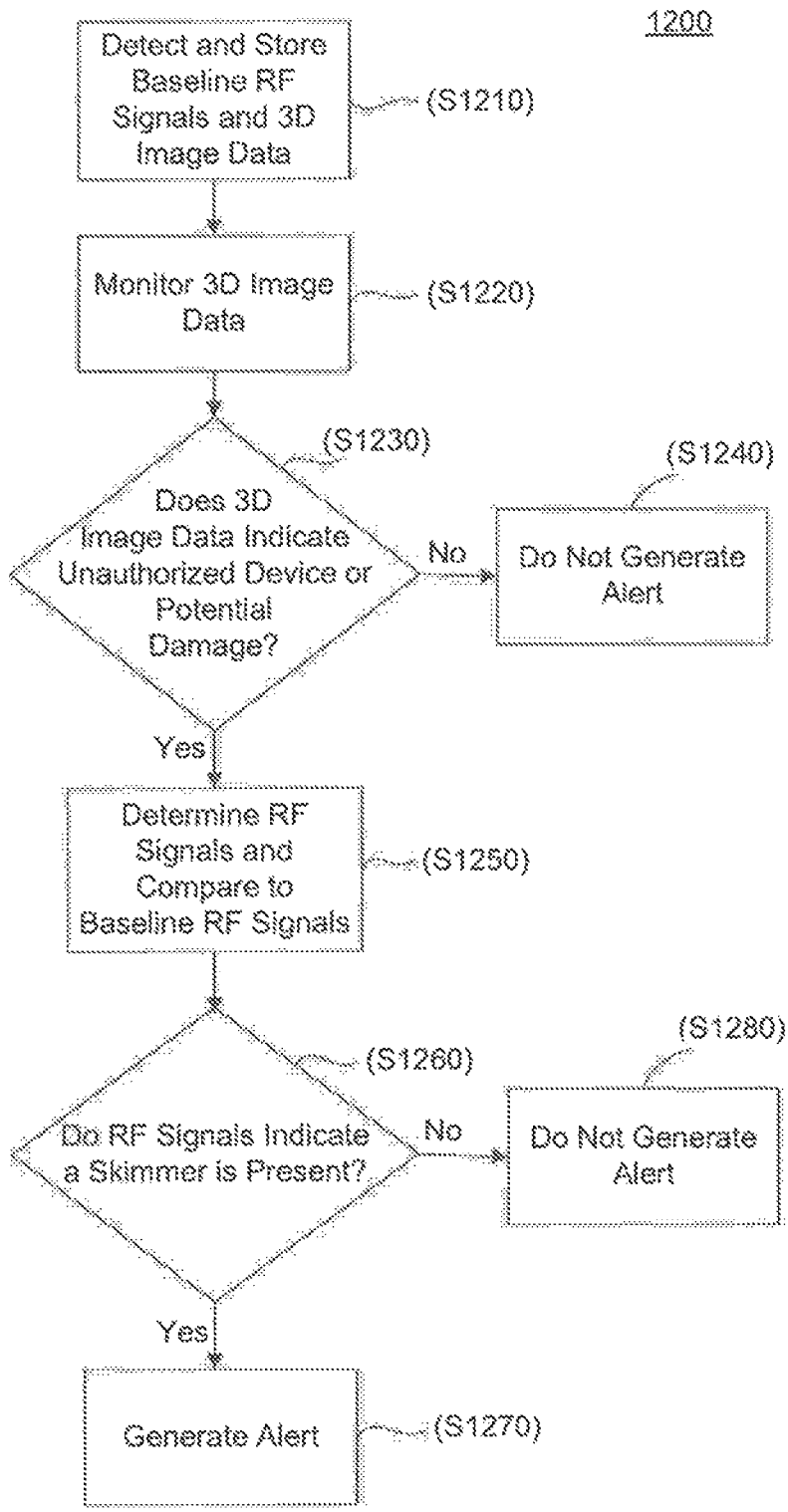
FIG. 12 is a flow chart demonstrating exemplary process 1200 for detecting unauthorized devices on ATMs, including ATM skimmers, and/or possible damage to ATMs based on 3D and RF detection consistent with disclosed embodiments.

FIG. 12 is a flow chart demonstrating exemplary process 1200 for detecting unauthorized devices on ATMs, including ATM skimmers, and/or possible damage to ATMs based on 3D and RF detection consistent with disclosed embodiments. In certain aspects, one or more operations of combined RF/3D detection process 1200 may be performed by combined RF/3D detection server 930. One or more operations of process 1200 may be performed by other components of system 900, such as receiver 120, 3D scanner 520, etc. In one embodiment, combined RF/3D detection server 930 may execute software instructions to perform operations of process 1200 to detect one or more skimmer and/or unauthorized devices that may be present on one or more ATMs. After detecting and storing baseline RF signals and 3D image data (S1210), combined RF/3D detection server 930 may be configured to monitor 3D image data (S1220) for example, using processes consistent with those described with respect to FIGS. 7 and 8. If 3D image data indicates that an unauthorized device or possible damage is not present (S1130; No), no alert may be generated (S1240), and combined RF/3D detection server 930 may continue to monitor 3D image data (e.g., S1220). If combined RF/3D detection server 930 detects differences in 3D image data that indicate an unauthorized device or possible damage is present, combined RF/3D detection server 930 may be configured to determine the current RF signals present near the monitored ATM and compare the current RF signals to the baseline RF signals for the ATM (S1250), for example, using processes consistent with those described with respect to FIGS. 3 and 4. If the differences in the RF signal comparison indicates a skimmer may be present (S1260; Yes), an alert may be generated (S1270) and transmitted to client terminal 940. If the RF signals do not indicate a skimmer is present (S1260; No), no alert may be generated (S1280). In certain embodiments, if the 3D image data indicates that an unauthorized device or possible damage may be present but the RF signals do not indicate a skimmer is present, an alert may be generated indicating that only 3D image data indicates an unauthorized device or possible damage present. One of ordinary skill in the art would understand the various alerts that would be advantageous for combined RF/3D detection server 930 to generate and transmit. In addition, alerts may be transmitted with other information about the detection (e.g., location of the ATM information, one or more images of the ATM, time information, etc.).

The disclosed embodiments may include methods, systems, and computer-readable storage media that provide skimmer detection processes for detecting skimmer(s), unauthorized devices, and/or possible damage for ATMs using incidental RF signal emissions and/or 3D image data. For purposes of explanation only, certain aspects and embodiments are described herein with reference to the components illustrated in FIGS. 1-12. The functionality of the illustrated components may overlap, however, and may be present in a fewer or greater number of elements and components. Further, all or part of the functionality of the illustrated elements may co-exist or be distributed among several geographically dispersed locations. Moreover, the disclosed embodiments may be implemented in various environments and are not limited to the illustrated embodiments.

Further, the sequence of operations described in connection with FIGS. 3-4, 7-8, and 11-12 are exemplary and not intended to be limiting. Additional or fewer operations or combinations of operations may be used or may vary without departing from the scope of the disclosed embodiments. For example, skimmer RF detection server 130 of system 100 may determine that a skimmer is present at an ATM using one or more of operations S420, S440, S450, and/or S460 of FIG. 4; unauthorized device detection server 530 of system 500 may determine that an unauthorized device or possible damage is present at an ATM using one or more of operations S820, S850, S860, and/or S880 of FIG. 8; and combined RF/3D server 930 of system 900 may determine that a skimmer, an unauthorized device, and/or possible damage is present at an ATM using one or more of operations S420, S440, S450, S460, S820, S850, S860, S880, S1130, S1160, S1230, and/or S1260. Combined RF/3D server 930 of system 900 may be configured to direct receiver 120 to the location of a potential skimmer identified based on 3D image analysis. Components 110, 120, and 130 of system 100 may be combined into a single device or may be directly connected without the use of network 150. Components 520 and 530 may be combined into a single device or may be directly connected without the user of network 550. Components 110, 120, 520, and 930 may be combined into a single device or may be directly connected without the use of network 950. Motion detection devices, video cameras, and/or photographic cameras, such as those described in relation to system 500 and 3D scanner 520, may be used in systems similar to systems 100 and/or 900. Furthermore, the disclosed embodiments need not perform the sequence of operations in any particular order, including those shown in FIGS. 3, 4, 7, 8, 11, and 12, and other operations may be used without departing from the scope of the disclosed embodiments. Also, the processes described herein are not inherently related to any particular system or apparatus and may be implemented by any suitable combination of components.

Other aspects of the disclosed embodiments will be apparent to those skilled in the art from consideration of the specification and practice of the disclosed embodiments. It is intended that the specification and examples be considered as exemplary only, with exemplary scopes of the disclosed embodiments being indicated by the following claims.

What is claimed is:

1. A system for detecting unauthorized devices on an ATM comprising:
    a memory storing instructions; and
    one or more processors configured to execute instructions to:
        capture, via a 3D scanner, 3D image data of an ATM, the 3D image data comprising first shape data of the ATM;
        determine a first difference between the first shape data and second shape data comprising baseline shape data for the ATM;
        perform a first comparison by comparing a first location to a second location, the first location being a location of the first difference and the second location being a location for a known unauthorized device;
        perform a second comparison by comparing the first shape data to third shape data, the third shape data comprising shape data of the known unauthorized device;
        determine that an unauthorized device may be present at the ATM, based on the first and second comparisons; and
        in response to determining that an unauthorized device may be present at the ATM:
            receive, at an antenna located within communication range of the ATM, radio frequency (RF) signal data comprising a detected ATM RF signal;
            determine an unidentified RF signal of the detected ATM RF signal;
            determine whether the unidentified RF signal is present for a predetermined period of time;
            determine whether a skimmer is present at the ATM based on a determination that the unidentified RF signal is present for a period of time and based on the second comparison.

2. The system of claim 1, wherein the 3D image data is captured when motion is not detected near the ATM by the 3D scanner.

3. The system of claim 1, wherein the one or more processors are further configured to:
    store the shape data for the unauthorized device in a memory when it is determined that the shape data does not match the shape data of a known device.

4. The system of claim 1, wherein the one or more processors are further configured to:
    generate an alert when it is determined that an unauthorized device is present at the ATM based on at least one of the first and second comparisons or the determination that a skimmer is present at the ATM, the alert comprising a location of the ATM.

5. The system of claim 4, wherein the one or more processors are further configured to:
    determine whether the shape data for an unauthorized device matches the shape data for a known device; and
        if it is determined that the shape data for an unauthorized device matches the shape data for a known device, the alert further comprises at least one of a name of the known device, an image of the known device, or information about how to disable the known device; and
        if it is determined that the shape data for an unauthorized device does not match the shape data for a known device, the alert further includes instructions for obtaining information related to the unauthorized device.

6. The system of claim 1, wherein the one or more processors are further configured to:
    determine whether the skimmer is present at the ATM based on whether an amplitude of the detected RF signals exceeds a threshold level.

7. The system of claim 1, wherein the one or more processors are further configured to:
    determine whether the unidentified RF signal matches an RF signal of a known skimmer.

8. The system of claim 7, wherein the one or more processors are further configured to:
    if it determined that the unidentified RF signal matches an RF signal of a known skimmer, determine that a skimmer is present at the ATM; and
    if it determined that the unidentified RF signal does not match an RF signal of a known skimmer, store the unidentified RF signal in a memory.

9. The system of claim 7, wherein the one or more processors are further configured to:
    determine whether the skimmer is present at the ATM based on a determination that the unidentified RF signal matches a signal of an unknown skimmer.

10. The system of claim 7, wherein the one or more processors are further configured to:
    generate an alert when it is determined that the skimmer is present at the ATM, the alert comprising a location of the ATM.

11. The system of claim 10, wherein the one or more processors are further configured to:
    if it is determined that the unidentified RF signal matches the RF signal of the known skimmer, the alert further comprises at least one of a name of the known skimmer, an image of the known skimmer, or information about how to disable the known skimmer; and
    if it is determined that the unidentified RF signal does not match the RF signal of the known skimmer, the alert further includes instructions for obtaining information related to the skimmer.

12. The system of claim 1, wherein the one or more processors are further configured to:
    determine a frequency associated with the unidentified RF signal;
    determine a frequency associated with the baseline RF signal;
    determine a second difference between the frequency associated with the unidentified RF signal and the frequency associated with the baseline signal; and
    determine whether the skimmer is present at the ATM based on a determination that the second difference exists.

13. The system of claim 1, wherein the one or more processors are further configured to:
    determine an amplitude associated with the unidentified RF signal;
    determine an amplitude associated with the baseline RF signal;
    determine a third difference between the amplitude associated with the unidentified RF signal and the amplitude associated with the baseline signal; and
    determine whether the skimmer is present at the ATM based on a determination that the third difference exists.

14. The system of claim 1, wherein the first difference is determined when a difference between the first shape data and the second shape data does not exceed a predetermined threshold.

15. The system of claim 1, wherein the one or more processors are further configured to:

determine a shape difference between the first shape data and the third shape data;

determine that the first shape data matches the third shape data when it is determined that the shape difference does not exceed a predetermined threshold; and store the shape data for the unauthorized device in a memory when it is determined that the first shape data matches the third shape data.

16. The system of claim 15, wherein, in response to determining that the first shape data matches the third shape data, the one or more processors are further configured to:

generate an alert signal comprising at least one of a name of the known unauthorized device, an image of the known unauthorized device, or information about how to disable the known unauthorized device; and transmit the alert signal to a client device.

17. The system of claim 1, wherein the second shape data is established based on confidence intervals for a normal shape data reading.

18. The system of claim 1, wherein the one or more processors are further configured to:

determine that the first difference is a false positive; and store the first difference.

19. A method for detecting unauthorized devices on an ATM, the method comprising:

capturing 3D image data of an ATM, the 3D image data comprising first shape data of the ATM;

determining a first difference between the first shape data and second shape data comprising baseline shape data for the ATM;

performing a first comparison by comparing a first location to a second location, the first location being a location of the first difference and the second location being a location for a known unauthorized device;

performing a second comparison by comparing the first shape data to third shape data, the third shape data comprising shape data of the known unauthorized device;

determining that an unauthorized device may be present at the ATM, based on the first and second comparisons; and in response to determining that an unauthorized device may be present at the ATM:

receiving, at an antenna located within communication range of the ATM, radio frequency (RF) signal data comprising a detected ATM RF signal;

determining an unidentified RF signal of the detected ATM RF signal;

determining whether the unidentified RF signal is present for a predetermined period of time;

determining whether a skimmer is present at the ATM based on a determination that the unidentified RF signal is present for a period of time and based on the second comparison.

* * * * *